(12) United States Patent
Zhang et al.

(10) Patent No.: US 11,777,716 B2
(45) Date of Patent: *Oct. 3, 2023

(54) KEY EXCHANGE METHOD AND APPARATUS

(71) Applicant: Huawei Technologies Co., Ltd., Shenzhen (CN)

(72) Inventors: Dongmei Zhang, Shenzhen (CN); Jing Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 80 days.

This patent is subject to a terminal disclaimer.

(21) Appl. No.: 17/243,081

(22) Filed: Apr. 28, 2021

(65) Prior Publication Data
US 2021/0266153 A1 Aug. 26, 2021

Related U.S. Application Data

(63) Continuation of application No. 16/443,723, filed on Jun. 17, 2019, now Pat. No. 11,025,414, which is a
(Continued)

(51) Int. Cl.
*H04L 9/08* (2006.01)
*H04W 12/041* (2021.01)
(Continued)

(52) U.S. Cl.
CPC .......... *H04L 9/0819* (2013.01); *H04L 63/061* (2013.01); *H04W 12/041* (2021.01);
(Continued)

(58) Field of Classification Search
None
See application file for complete search history.

(56) References Cited

U.S. PATENT DOCUMENTS

2004/0165726 A1* 8/2004 Yamamichi .......... H04L 9/0869
380/277
2004/0260950 A1* 12/2004 Ougi .................... H04L 9/0833
726/1
(Continued)

FOREIGN PATENT DOCUMENTS

CN 101321053 A 12/2008
CN 101772199 A 7/2010
(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331, V11.2.0 (Dec. 2012), pp. 1-340.
(Continued)

*Primary Examiner* — Brandon Hoffman
(74) *Attorney, Agent, or Firm* — Slater Matsil, LLP

(57) ABSTRACT

Embodiments of the present invention disclose a key exchange method and apparatus. A network device acquires a first key, and sends a message including the first key to a second user equipment, so that the second user equipment uses, when communicating with a first user equipment by using a D2D link, the first key to protect transmitted information.

20 Claims, 10 Drawing Sheets

Related U.S. Application Data continuation of application No. 15/890,900, filed on Feb. 7, 2018, now Pat. No. 10,397,775, which is a continuation of application No. 14/842,945, filed on Sep. 2, 2015, now Pat. No. 9,924,354, which is a continuation of application No. PCT/CN2013/072188, filed on Mar. 5, 2013.

(51) Int. Cl.
  *H04W 12/0431* (2021.01)
  *H04L 9/40* (2022.01)
  *H04W 76/14* (2018.01)

(52) U.S. Cl.
  CPC ......... *H04W 12/0431* (2021.01); *H04L 63/06* (2013.01); *H04L 63/205* (2013.01); *H04W 76/14* (2018.02)

(56) References Cited

U.S. PATENT DOCUMENTS

| | | | |
|---|---|---|---|
| 2007/0168527 A1* | 7/2007 | Li | H04L 65/1106 709/228 |
| 2010/0040236 A1 | 2/2010 | Xu et al. | |
| 2010/0285774 A1 | 11/2010 | Ginzboorg | |
| 2011/0138185 A1* | 6/2011 | Ju | G06F 21/10 380/279 |
| 2012/0015607 A1 | 1/2012 | Koskela et al. | |
| 2012/0272051 A1 | 10/2012 | Chittigala et al. | |
| 2013/0013926 A1* | 1/2013 | Hakola | H04W 12/041 713/171 |

FOREIGN PATENT DOCUMENTS

| | | |
|---|---|---|
| CN | 102340876 A | 2/2012 |
| CN | 102422659 A | 4/2012 |
| CN | 102711105 A | 10/2012 |
| CN | 102812688 A | 12/2012 |
| EP | 2408234 A1 | 1/2012 |
| EP | 2663107 A1 | 11/2013 |
| EP | 2696614 A1 | 2/2014 |
| WO | 2010007205 A1 | 1/2010 |
| WO | 2011117677 A1 | 9/2011 |
| WO | 2012137633 A1 | 10/2012 |

OTHER PUBLICATIONS

3rd Generation Partnership Project; Technical Specification Group SA; Feasibility Study for Proximity Services (ProSe) (Release 12), 3GPP TR 22.803, V0.2.0 (Feb. 2012), pp. 1-18.

3rd Generation Partnership Project; Technical Specification Group Services and System Aspects; Study on architecture enhancements to support Proximity Services (ProSe) (Release 12), 3GPP TR 23.703, V0. 1.0 (Feb. 2013), pp. 1-7.

3rd Generation Partnership Project, Technical Specification Group Services and System Aspects; Generic Authentication Architecture (GAA); Generic Bootstrapping Architecture (GBA) (Release 11), 3GPP TS 33.220 V11.4.0 (Sep. 2012), 92 pages.

3rd Generation Partnership Project; Technical Specification Group Services and System Aspects; 3GPP System Architecture Evolution (SAE); Security architecture (Release 12), 3GPP TS 33.401, V12. 6.0 (Dec. 2012), pp. 1-121.

3rd Generation Partnership Project; Technical Specification Group Services and System Aspects; System Architecture Evolution (SAE); Security architecture; (Release 8), 3GPP TS 33.401 V8.3.1 (Mar. 2009), pp. 1-61.

* cited by examiner

KEY EXCHANGE METHOD AND APPARATUS

CROSS-REFERENCE TO RELATED APPLICATIONS

This application is a continuation of U.S. application Ser. No. 16/443,723, filed on Jun. 17, 2019, now U.S. patent Ser. No. 11/025,414, which is a continuation of U.S. application Ser. No. 15/890,900, filed on Feb. 7, 2018, now U.S. patent Ser. No. 10/397,775. which is a continuation of U.S. application Ser. No. 14/842,945, filed on Sep. 2, 2015, now U.S. Pat. No. 9,924,354, which is a continuation of International Application No. PCT/CN2013/072188, filed on Mar. 5, 2013. All of the afore-mentioned patent applications are hereby incorporated by reference in their entireties.

TECHNICAL FIELD

The present disclosure relates to the communications field, and in particular, to a key exchange method and apparatus.

BACKGROUND

Device to device (D2D) communication provided by the 3rd Generation Partnership Project (3GPP) is a communications technology that allows terminals to use a cell resource to directly communicate with each other in an evolved universal terrestrial radio access network (E-UTRAN).

As shown in FIG. 1, user equipment (UE) not only may communicate with each other by using an evolved Node B (eNB) but also may directly communicate with each other by using an air interface Ud. A Ud interface may provide a direct link (D2D link) between different UEs, and the D2D link may directly transmit, without using the eNB, service data and/or a signaling message between the UEs.

However, a problem is as follows. When a user equipment (UE) transmits service data and/or a signaling message by using a Ud interface, no corresponding security mechanism can ensure that the transmitted service data and/or signaling message will not be tampered with. Therefore, a security protection mechanism implementing that information is transmitted on a Ud interface is urgently needed.

SUMMARY

Embodiments of the present invention provide a key exchange method and apparatus, which can enable user equipment establishing a D2D link to share a set of keys, and further, information security can be achieved when a user equipment transmits service data and/or a signaling message through a Ud interface.

A first aspect of the embodiments of the present invention provides a key exchange method, where a device to device (D2D) link is established between a first user equipment and a second user equipment. The method includes acquiring, by a network device, a first key. The method also includes sending, by the network device, a message including the first key to the second user equipment, so that the second user equipment uses, when communicating with the first user equipment by using the D2D link, the first key to protect transmitted information.

With reference to the first aspect and the foregoing possible implementation manner, in another possible implementation manner, the acquiring, by a network device, a first key includes: acquiring, by the network device, a second key, where the second key is a shared key between the network device and the first user equipment; and generating, by the network device, the first key according to the second key and a first parameter by using a key derivation function, where: the network device is an evolved Node B (eNB), a mobility management entity (MME), or a proximity service server; and the first parameter includes a packet data convergence protocol (PDCP) serial number between the eNB and the first user equipment, or the first parameter includes a non-access stratum message serial number between the MME and the first user equipment, or the first parameter includes a random number generated by the network device.

With reference to the first aspect and the foregoing possible implementation manner, in another possible implementation manner, the first key is a random key acquired by the network device; and after the acquiring, by a network device, a first key, the method further includes: sending, by the network device, a message including the first key to the first user equipment, so that the first user equipment uses, when communicating with the second user equipment by using the D2D link, the first key to protect the transmitted information.

With reference to the first aspect and the foregoing possible implementation manners, in another possible implementation manner, before the sending, by the network device, a message including the first key to the first user equipment, the method further includes: receiving, by the network device, a first public key from the first user equipment; and encrypting, by the network device, the first key by using the first public key, where: the first public key and a first private key that is reserved by the first user equipment form a first public-private key pair; alternatively, generating, by the network device, a third key according to a second key; and encrypting, by the network device, the first key by using the third key, where the second key is a shared key between the network device and the first user equipment; and the sending, by the network device, a message including the first key to the first user equipment is specifically: sending, by the network device, a message including an encrypted first key to the first user equipment.

With reference to the first aspect and the foregoing possible implementation manners, in another possible implementation manner, the sending, by the network device, a message including the first key to the first user equipment is specifically: sending, by the network device, the message including the first key to the first user equipment by using an encrypted connection between the network device and the first user equipment.

With reference to the first aspect and the foregoing possible implementation manners, in another possible implementation manner, before the sending, by the network device, a message including the first key to the second user equipment, the method further includes: receiving, by the network device, a second public key from the second user equipment; and encrypting, by the network device, the first key by using the second public key, where: the second public key and a second private key that is reserved by the second user equipment form a second public-private key pair; alternatively, acquiring, by the network device, a fourth key, where the fourth key is a shared key between the network device and the second user equipment; and generating, by the network device, a fifth key according to the fourth key, and encrypting the first key by using the fifth key; and the sending, by the network device, a message including the first key to the second user equipment is specifically: sending, by the network device, a message including an encrypted first key to the second user equipment.

With reference to the first aspect and the foregoing possible implementation manners, in another possible implementation manner, the sending, by the network device, a message including the first key to the second user equipment is specifically: sending, by the network device, the message including the first key to the second user equipment by using an encrypted connection between the network device and the second user equipment.

With reference to the first aspect and the foregoing possible implementation manners, in another possible implementation manner, the method further includes: determining, by the network device according to a prestored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list; and sending, by the network device, the cryptographic algorithm to the first user equipment and the second user equipment, where: the security capability of the first user equipment is used to indicate a cryptographic algorithm applicable to the first user equipment; the security capability of the second user equipment is used to indicate a cryptographic algorithm applicable to the second user equipment; and the cryptographic algorithm includes an encryption algorithm and/or an integrity protection algorithm, where the encryption algorithm is used to encrypt data transmitted on the D2D link, and the integrity protection algorithm is used to perform integrity protection on information transmitted on the D2D link.

With reference to the first aspect and the foregoing possible implementation manners, in another possible implementation manner, if the network device is not a network device serving the second user equipment, the sending, by the network device, a message including the first key to the second user equipment is specifically: sending, by the network device, the message including the first key to the network device serving the second user equipment, so that the network device serving the second user equipment forwards the message including the first key to the second user equipment.

According to a second aspect of the embodiments of the present invention, a key exchange method is further provided, where a D2D link is established between a first user equipment and a second user equipment. The method includes acquiring, by the first user equipment, a first key. The method also includes using, by the first user equipment when communicating with the second user equipment by using the D2D link, the first key to protect transmitted information.

With reference to the second aspect and the foregoing possible implementation manner, in another possible implementation manner, after the acquiring, by the first user equipment, a first key, the method further includes: receiving, by the first user equipment, a cryptographic algorithm from a network device, where the network device is an evolved Node B (eNB), a mobility management entity (MME), or a proximity service server, and the cryptographic algorithm includes an encryption algorithm and/or an integrity protection algorithm; generating, by the first user equipment, an encryption key according to the first key and the encryption algorithm; and generating, by the first user equipment, an integrity protection key according to the first key and the integrity protection algorithm; and the using, by the first user equipment when communicating with the second user equipment by using the D2D link, the first key to protect transmitted information specifically includes: encrypting, by the first user equipment by using the encryption key and the encryption algorithm, information transmitted on the D2D link; and performing, by the first user equipment by using the integrity protection key and the integrity protection algorithm, integrity protection on the information transmitted on the D2D link.

With reference to the second aspect and the foregoing possible implementation manner, in another possible implementation manner, the acquiring, by the first user equipment, a first key includes: acquiring, by the first user equipment, a second key, where the second key is a shared key between the network device and the first user equipment; and generating, by the first user equipment, the first key according to the second key and a first parameter by using a key derivation function, where: the first parameter includes a packet data convergence protocol (PDCP) serial number between an evolved Node B (eNB) and the first user equipment, or the first parameter includes a non-access stratum message serial number between a mobility management entity (MME) and the first user equipment, or the first parameter includes a random number generated by the network device; alternatively, receiving, by the first user equipment, a message that is from the network device and includes the first key.

With reference to the second aspect and the foregoing possible implementation manners, in another possible implementation manner, before the receiving, by the first user equipment, a message that is from the network device and includes the first key, the method further includes: sending, by the first user equipment, a public key to the network device, so that the network device encrypts the first key by using the public key, where the public key and a private key that is reserved by the first user equipment form a public-private key pair.

With reference to the second aspect and the foregoing possible implementation manners, in another possible implementation manner, the receiving, by the first user equipment, a message that is from the network device and includes the first key specifically includes: receiving, by the first user equipment, a message that is from the network device and includes a first key encrypted by using the public key.

With reference to the second aspect and the foregoing possible implementation manners, in another possible implementation manner, the receiving, by the first user equipment, a message that is from the network device and includes the first key specifically includes: receiving, by the first user equipment by using an encrypted connection between the first user equipment and the network device, the message that is from the network device and includes the first key.

With reference to the second aspect and the foregoing possible implementation manners, in another possible implementation manner, the receiving, by the first user equipment, a message that is from the network device and includes the first key specifically includes: receiving, by the first user equipment, a message that is from the network device and includes a first key encrypted by using a third key, where: the third key is a key generated by the network device according to the second key.

With reference to the second aspect and the foregoing possible implementation manners, in another possible implementation manner, if the network device is not a network device serving the first user equipment, the receiving, by the first user equipment, a message that is from the network device and includes the first key specifically includes: receiving, by the first user equipment, the message that is from the network device serving the first user equipment and includes the first key, where the message including the first key is received from the network device by the network device serving the first user equipment.

A third aspect of the embodiments of the present invention further provides a key exchange method, where a D2D link is established between a first user equipment and a second user equipment. The method includes acquiring, by the first user equipment, a first DH exchange value. The method also includes sending, by the first user equipment, the first DH exchange value to a network device, so that the network device sends the first DH exchange value to the second user equipment. The second user equipment acquires a second DH exchange value. Further, the second user equipment generates a key according to the first DH exchange value. Further, the second user equipment sends the second DH exchange value to the network device. The method also includes receiving, by the first user equipment, the second DH exchange value from the network device, and generating the key according to the second DH exchange value, where the key is used to protect data transmitted on the D2D link.

A fourth aspect of the embodiments of the present invention further provides a key exchange method, where a D2D link is established between a first user equipment and a second user equipment. The method includes: receiving, by a network device, a first DH exchange value from the first user equipment. The method also includes sending, by the network device, the first DH exchange value to the second user equipment, so that the second user equipment acquires a second DH exchange value, and further, the second user equipment generates a key according to the first DH exchange value. The method also includes receiving, by the network device, the second DH exchange value from the second user equipment. The method also includes sending, by the network device, the second DH exchange value to the first user equipment, so that the first user equipment generates the key according to the second DH exchange value.

A fifth aspect of the embodiments of the present invention further provides a network device, where a D2D link is established between a first user equipment and a second user equipment. The network device includes: an acquiring unit, configured to acquire a first key. The network device also includes a first sending unit, configured to send a message including the first key to the second user equipment, so that the second user equipment uses, when communicating with the first user equipment by using the D2D link, the first key to protect transmitted information.

With reference to the fifth aspect and the foregoing possible implementation manner, in another possible implementation manner, the acquiring unit includes: an acquiring module, configured to acquire a second key, where the second key is a shared key between the network device and the first user equipment; and a generating module, configured to generate the first key according to the second key and a first parameter by using a key derivation function, where: the network device is an evolved Node B (eNB), a mobility management entity (MME), or a proximity service server; and the first parameter includes a packet data convergence protocol (PDCP) serial number between the eNB and the first user equipment, or the first parameter includes a non-access stratum message serial number between the MME and the first user equipment, or the first parameter includes a random number generated by the network device.

With reference to the fifth aspect and the foregoing possible implementation manners, in another possible implementation manner, the first key is a random key acquired by the network device; and the network device further includes: a second sending unit, configured to: after the acquiring unit acquires the first key, send a message including the first key to the first user equipment, so that the first user equipment uses, when communicating with the second user equipment by using the D2D link, the first key to protect the transmitted information.

With reference to the fifth aspect and the foregoing possible implementation manners, in another possible implementation manner, the network device further includes: a first receiving unit, configured to: before the second sending unit sends the message including the first key to the first user equipment, receive a first public key from the first user equipment; and a first encrypting unit, configured to encrypt the message including the first key by using the first public key received by the first receiving unit, where: the first public key and a first private key that is reserved by the first user equipment form a first public-private key pair; alternatively, the network device further includes: a first generating unit, configured to: before the second sending unit sends the message including the first key to the first user equipment, generate a third key according to a second key; and a first encrypting unit, configured to encrypt the first key by using the third key generated by the first generating unit, where the second key is a shared key between the network device and the first user equipment; and a second sending unit is further configured to send a message including a first key encrypted by the first encrypting unit to the first user equipment.

With reference to the fifth aspect and the foregoing possible implementation manners, in another possible implementation manner, the second sending unit is further configured to send the message including the first key to the first user equipment by using an encrypted connection between the network device and the first user equipment.

With reference to the fifth aspect and the foregoing possible implementation manners, in another possible implementation manner, the network device further includes: a second receiving unit, configured to: before the first sending unit sends the message including the first key to the second user equipment, receive a second public key from the second user equipment; and a second encrypting unit, configured to encrypt the message including the first key by using the second public key received by the second receiving unit, where: the second public key and a second private key that is reserved by the second user equipment form a second public-private key pair; alternatively, the network device further includes: a second generating unit, configured to: before the first sending unit sends the message including the first key to the second user equipment, acquire a fourth key, and generate a fifth key according to the fourth key; and the second encrypting unit, configured to encrypt the first key by using the fifth key generated by the second generating unit, where: the fourth key is a shared key between the network device and the second user equipment; and the first sending unit is further configured to send a message including a first key encrypted by the second encrypting unit to the second user equipment.

With reference to the fifth aspect and the foregoing possible implementation manners, in another possible implementation manner, the first sending unit is further configured to send the message including the first key to the second user equipment by using an encrypted connection between the network device and the second user equipment.

With reference to the fifth aspect and the foregoing possible implementation manners, in another possible implementation manner, the network device further includes: a determining unit, configured to determine, according to a prestored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list; and a third sending unit, configured to send the cryptographic algorithm to the first user equipment and the second user equipment, where: the security capability of the first user equipment is used to indicate a cryptographic algorithm applicable to the first user equipment; the security capability of the second user equipment is used to indicate a cryptographic algorithm applicable to the second user equipment; and the cryptographic algorithm includes an encryption algorithm and/or an integrity protection algorithm, where the encryption algorithm is used to encrypt data transmitted on the D2D link, and the integrity protection algorithm is used to perform integrity protection on information transmitted on the D2D link.

With reference to the fifth aspect and the foregoing possible implementation manners, in another possible implementation manner, the first sending unit is further configured to: if the network device is not a network device serving the second user equipment, send the message including the first key to the network device serving the second user equipment, so that the network device serving the second user equipment forwards the message including the first key to the second user equipment.

A sixth aspect of the embodiments of the present invention further provides a user equipment, where a D2D link is established between the user equipment and a second user equipment. The user equipment includes: an acquiring unit, configured to acquire a first key. The user equipment also includes a protecting unit, configured to use, when communicating with the second user equipment by using the D2D link, the first key to protect transmitted information.

With reference to the sixth aspect, in a possible implementation manner, the user equipment further includes: a receiving unit, configured to: after the acquiring unit acquires the first key, receive a cryptographic algorithm from a network device, where the network device is an evolved Node B (eNB), a mobility management entity (MME), or a proximity service server, and the cryptographic algorithm includes an encryption algorithm and/or an integrity protection algorithm; a first generating unit, configured to generate an encryption key according to the first key acquired by the acquiring unit and the encryption algorithm received by the receiving unit; and a second generating unit, configured to generate an integrity protection key according to the first key acquired by the acquiring unit and the integrity protection algorithm received by the receiving unit, where: the protecting unit includes: an encrypting module, configured to encrypt, by using the encryption key and the encryption algorithm, information transmitted on the D2D link; and a protecting module, configured to perform, by using the integrity protection key and the integrity protection algorithm, integrity protection on the information transmitted on the D2D link.

With reference to the sixth aspect and the foregoing possible implementation manner, in another possible implementation manner, the acquiring unit includes: an acquiring module, configured to acquire a second key, where the second key is a shared key between the network device and the user equipment; and a generating module, configured to generate the first key according to the second key and a first parameter by using a key derivation function, where: the first parameter includes a packet data convergence protocol (PDCP) serial number between an evolved Node B (eNB) and the first user equipment, or the first parameter includes a non-access stratum message serial number between a mobility management entity (MME) and the first user equipment, or the first parameter includes a random number generated by the network device; alternatively, the acquiring unit is further configured to receive a message that is from the network device and includes the first key.

With reference to the sixth aspect and the foregoing possible implementation manners, in another possible implementation manner, the user equipment further includes: a sending unit, configured to: before the acquiring unit receives the message that is from the network device and includes the first key, send a public key to the network device, so that the network device encrypts the first key by using the public key, where the public key and a private key that is reserved by the user equipment form a public-private key pair.

With reference to the sixth aspect and the foregoing possible implementation manners, in another possible implementation manner, the acquiring unit is further configured to receive a message that is from the network device and includes a first key encrypted by using the public key.

With reference to the sixth aspect and the foregoing possible implementation manners, in another possible implementation manner, the acquiring unit is further configured to receive, by using an encrypted connection between the user equipment and the network device, the message that is from the network device and includes the first key.

With reference to the sixth aspect and the foregoing possible implementation manners, in another possible implementation manner, the acquiring unit is further configured to receive a message that is from the network device and includes a first key encrypted by using a third key, where: the third key is a key generated by the network device according to the second key.

With reference to the sixth aspect and the foregoing possible implementation manners, in another possible implementation manner, the acquiring unit is further configured to: if the network device is not a network device serving the user equipment, receive the message that is from the network device serving the user equipment and includes the first key, where the message including the first key is received from the network device by the network device serving the user equipment.

A seventh aspect of the embodiments of the present invention further provides a user equipment, where a D2D link is established between the user equipment and a second user equipment. The user equipment includes: an acquiring unit, configured to acquire a first DH exchange value. The user equipment also includes a sending unit, configured to send the first DH exchange value to a network device, so that the network device sends the first DH exchange value to the second user equipment. The second user equipment acquires a second DH exchange value. Further, the second user equipment generates a key according to the first DH exchange value. Further, the second user equipment sends the second DH exchange value to the network device. The user equipment also includes a receiving unit, configured to receive the second DH exchange value from the network device, and generate the key according to the second DH exchange value. The key is used to protect data transmitted on the D2D link.

An eighth aspect of the embodiments of the present invention further provides a network device, where a D2D link is established between a first user equipment and a second user equipment. The network device includes a first receiving unit, configured to receive a first DH exchange value from the first user equipment. The network device also includes a first sending unit, configured to send the first DH exchange value to the second user equipment, so that the second user equipment acquires a second DH exchange value, and further, the second user equipment generates a key according to the first DH exchange value. The network device also includes a second receiving unit, configured to receive the second DH exchange value from the second user equipment. The network device also includes a second sending unit, configured to send the second DH exchange value to the first user equipment, so that the first user equipment generates the key according to the second DH exchange value.

A ninth aspect of the embodiments of the present invention further provides a network device, where a D2D link is established between a first user equipment and a second user equipment. The network device includes: a processor, configured to acquire a first key. The network device also includes a sender, configured to send a message including the first key to the second user equipment, so that the second user equipment uses, when communicating with the first user equipment by using the D2D link, the first key to protect transmitted information.

With reference to the ninth aspect, in a possible implementation manner, the processor is further configured to: acquire a second key, where the second key is a shared key between the network device and the first user equipment; and generate the first key according to the second key and a first parameter by using a key derivation function; and the network device is an evolved Node B (eNB), a mobility management entity (MME), or a proximity service server; and the first parameter includes a packet data convergence protocol (PDCP) serial number between the eNB and the first user equipment, or the first parameter includes a non-access stratum message serial number between the MME and the first user equipment, or the first parameter includes a random number generated by the network device.

With reference to the ninth aspect and the foregoing possible implementation manner, in another possible implementation manner, the first key is a random key acquired by the network device; and the sender is further configured to: after the processor acquires the first key, send a message including the first key to the first user equipment, so that the first user equipment uses, when communicating with the second user equipment by using the D2D link, the first key to protect the transmitted information.

With reference to the ninth aspect and the foregoing possible implementation manners, in another possible implementation manner, the network device further includes: a receiver, configured to: before the sender sends the message including the first key to the first user equipment, receive a first public key from the first user equipment, where: the processor is further configured to encrypt the first key by using the first public key, where: the first public key and a first private key that is reserved by the first user equipment form a first public-private key pair; alternatively, the processor is further configured to generate a third key according to a second key, and encrypt the first key by using the third key, where the second key is a shared key between the network device and the first user equipment; and the sender is further configured to send a message including a second key encrypted by the processor to the first user equipment.

With reference to the ninth aspect and the foregoing possible implementation manners, in another possible implementation manner, the sender is further configured to send the message including the first key to the first user equipment by using an encrypted connection between the network device and the first user equipment.

With reference to the ninth aspect and the foregoing possible implementation manners, in another possible implementation manner, a receiver is further configured to: before the sender sends the message including the first key to the second user equipment, receive a second public key from the second user equipment; and the processor is further configured to encrypt the first key by using the second public key, where: the second public key and a second private key that is reserved by the second user equipment form a second public-private key pair; alternatively, the processor is further configured to: acquire a fourth key, where the fourth key is a shared key between the network device and the second user equipment; and generate a fifth key according to the fourth key, and encrypt the first key by using the fifth key; and the sender is further configured to send a message including a second key encrypted by the processor to the second user equipment.

With reference to the ninth aspect and the foregoing possible implementation manners, in another possible implementation manner, the sender is further configured to send the message including the first key to the second user equipment by using an encrypted connection between the network device and the second user equipment.

With reference to the ninth aspect and the foregoing possible implementation manners, in another possible implementation manner, the processor is further configured to determine, according to a prestored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list; and the sender is further configured to send the cryptographic algorithm to the first user equipment and the second user equipment, where: the security capability of the first user equipment is used to indicate a cryptographic algorithm applicable to the first user equipment; the security capability of the second user equipment is used to indicate a cryptographic algorithm applicable to the second user equipment; and the cryptographic algorithm includes an encryption algorithm and/or an integrity protection algorithm, where the encryption algorithm is used to encrypt data transmitted on the D2D link, and the integrity protection algorithm is used to perform integrity protection on information transmitted on the D2D link.

With reference to the ninth aspect and the foregoing possible implementation manners, in another possible implementation manner, the sender is further configured to: if the network device is not a network device serving the second user equipment, send the message including the first key to the network device serving the second user equipment, so that the network device serving the second user equipment forwards the message including the first key to the second user equipment.

A tenth aspect of the embodiments of the present invention further provides a user equipment, where a D2D link is established between the user equipment and a second user equipment. The user equipment includes: a processor, configured to acquire a first key. The user equipment also includes a memory, configured to store the first key acquired by the processor. The processor is further configured to use, when communicating with the second user equipment by using the D2D link, the first key to protect transmitted information.

With reference to the tenth aspect, in a possible implementation manner, the user equipment further includes: a receiver, configured to: after the processor acquires the first key, receive a cryptographic algorithm from a network device, where the network device is an evolved Node B (eNB), a mobility management entity (MME), or a proximity service server, and the cryptographic algorithm includes an encryption algorithm and/or an integrity protection algorithm, where: the processor is further configured to: generate an encryption key according to the first key and the encryption algorithm; generate an integrity protection key according to the first key and the integrity protection algorithm; encrypt, by using the encryption key and the encryption algorithm, information transmitted on the D2D link; and perform, by using the integrity protection key and the integrity protection algorithm, integrity protection on the information transmitted on the D2D link.

With reference to the tenth aspect and the foregoing possible implementation manner, in another possible implementation manner, the processor is further configured to: acquire a second key, where the second key is a shared key between the network device and the user equipment; and generate the first key according to the second key and a first parameter by using a key derivation function, where: the first parameter includes a packet data convergence protocol (PDCP) serial number between an evolved Node B (eNB) and the first user equipment, or the first parameter includes a non-access stratum message serial number between a mobility management entity (MME) and the first user equipment, or the first parameter includes a random number generated by the network device; alternatively, the receiver is further configured to receive a message that is from the network device and includes the first key.

With reference to the tenth aspect and the foregoing possible implementation manners, in another possible implementation manner, the user equipment further includes: a sender, configured to: before the receiver receives the message that is from the network device and includes the first key, send a public key to the network device, so that the network device encrypts the first key by using the public key, where the public key and a private key that is reserved by the user equipment form a public-private key pair.

With reference to the tenth aspect and the foregoing possible implementation manners, in another possible implementation manner, the receiver is further configured to receive a message that is from the network device and includes a first key encrypted by using the public key.

With reference to the tenth aspect and the foregoing possible implementation manners, in another possible implementation manner, the receiver is further configured to receive, by using an encrypted connection between the user equipment and the network device, the message that is from the network device and includes the first key.

With reference to the tenth aspect and the foregoing possible implementation manners, in another possible implementation manner, the receiver is further configured to receive a message that is from the network device and includes a first key encrypted by using a third key, where: the third key is a key generated by the network device according to the second key.

With reference to the tenth aspect and the foregoing possible implementation manners, in another possible implementation manner, the receiver is further configured to: if the network device is not a network device serving the user equipment, receive the message that is from the network device serving the user equipment and includes the first key, where the message including the first key is received from the network device by the network device serving the user equipment.

An eleventh aspect of the embodiments of the present invention further provides a user equipment, where a D2D link is established between the user equipment and a second user equipment. The user equipment includes: a processor, configured to acquire a first DH exchange value. The user equipment also includes a sender, configured to send the first DH exchange value to a network device, so that the network device sends the first DH exchange value to the second user equipment. The second user equipment acquires a second DH exchange value. Further, the second user equipment generates a key according to the first DH exchange value. Further, the second user equipment sends the second DH exchange value to the network device. The user equipment also includes a receiver, configured to receive the second DH exchange value from the network device, and generate the key according to the second DH exchange value. The key is used to protect data transmitted on the D2D link.

A twelfth aspect of the embodiments of the present invention further provides a network device, where a D2D link is established between a first user equipment and a second user equipment. The network device includes a receiver, configured to receive a first DH exchange value from the first user equipment. The network device also includes a sender, configured to send the first DH exchange value to the second user equipment, so that the second user equipment acquires a second DH exchange value, and further, the second user equipment generates a key according to the first DH exchange value. The receiver is further configured to receive the second DH exchange value from the second user equipment. The sender is further configured to send the second DH exchange value to the first user equipment, so that the first user equipment generates the key according to the second DH exchange value.

According to the key exchange method and apparatus provided by the embodiments of the present invention, a network device acquires a first key, and sends a message including the first key to a second user equipment, so that the second user equipment uses, when communicating with a first user equipment by using a D2D link, the first key to protect transmitted information. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

All technologies described in this specification may be applied to a long term evolution (LTE) system. A user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or a user equipment, which is not limited in the present invention.

In addition, the terms "system" and "network" may be used interchangeably in this specification. The term "and/or" in this specification describes only an association relationship for describing associated objects and indicates that three relationships may exist. For example, A and/or B may represent the following three cases: Only A exists, both A and B exist, and only B exists. In addition, the character "/" in this specification generally indicates an "or" relationship between the associated objects.

Figure 1:
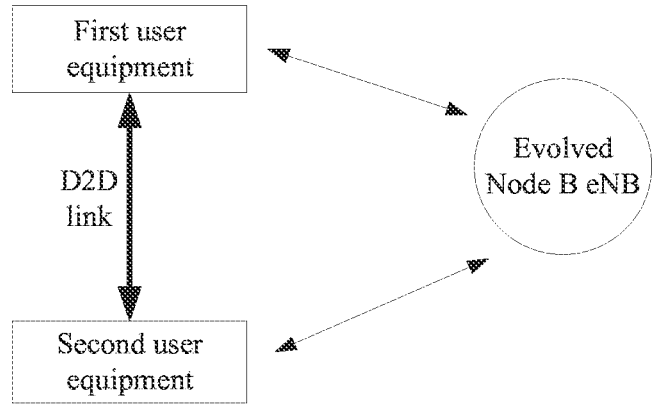
FIG. 1 is a schematic diagram of communication between user equipment by using a D2D link according to the background of the present invention.
Figure 2:
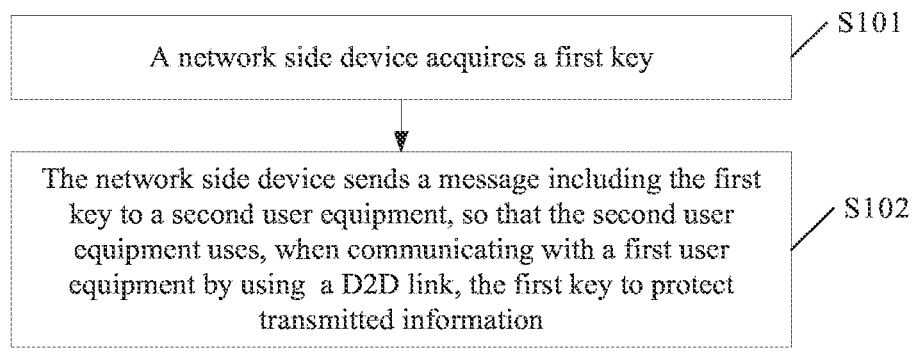
FIG. 2 is a flowchart of a key exchange method according to an embodiment of the present invention.

An embodiment of the present invention provides a key exchange method, where a device to device (D2D) link is established between a first user equipment and a second user equipment. As shown in FIG. 2, the method includes the following.

S101: A network device acquires a first key.

The network device may be an evolved Node B (eNB), a mobility management entity (MME), or a proximity service server.

In one application scenario of this embodiment of the present invention, a method used by the network device to acquire the first key may include: acquiring, by the network device, a second key; and generating, by the network device, the first key according to the second key by using a key derivation function.

In this application scenario, when the network device is an evolved Node B (eNB), the second key is a shared key between the eNB and the first user equipment, for example, one or more of keys such as KeNB, KRRC.int, KRRC.enc, KUP.enc, and KUP.int; when the network device is a mobility management entity (MME), the second key is a shared key between the MME and the first user equipment, for example, one or more of keys such as KASME, KNAS.enc, and KNAS.int; when the network device is a proximity service server, the second key is a shared key between the proximity service server and the first user equipment.

Specifically, the generating, by the network device, the first key according to the second key by using a key derivation function includes: generating, by the network device, the first key according to the second key and a first parameter by using the key derivation function, where the first parameter includes a packet data convergence protocol (PDCP) serial number between the eNB and the first user equipment; or the first parameter includes a non-access stratum message serial number between the MME and the first user equipment; or the first parameter includes a random number generated by the network device.

Specifically, in order to avoid keys (first keys) of D2D links that are established at different times are the same, this embodiment of the present invention introduces a random variable, that is, the first parameter, into a generating process of the first key. The first parameter may be the PDCP serial number between the eNB and the first user equipment, or the non-access stratum message serial number between the MME and the first user equipment, or the random number generated by the network device, or a parameter generated according to a shared key between the network device and the second user equipment.

The first parameter may include not only the random parameters enumerated above but also some fixed parameters. For example, the network device may generate, according to an identity of the first user equipment, an identity of the second user equipment, and another input parameter, a random key by using the key derivation function.

In another application scenario of this embodiment of the present invention, the first key may be a random key acquired by the network device.

S102: The network device sends a message including the first key to the second user equipment, so that the second user equipment uses, when communicating with the first user equipment by using the D2D link, the first key to protect transmitted information.

In one application scenario of this embodiment of the present invention, when the second key is a shared key between the network device and the first user equipment, because the first user equipment and the network device share this key, the network device only needs to send, after generating the first key, the message including the first key to the second user equipment, so that the second user equipment uses, when communicating with the first user equipment by using the D2D link, the first key to protect the transmitted information. In addition, the first user equipment may generate the first key according to the shared key between the network device and the first user equipment. A method used by the first user equipment to generate the first key according to the shared key between the network device and the first user equipment is similar to the method used by the network device to generate the first key according to the shared key, and details are not repeatedly described in this embodiment of the present invention.

In another application scenario of this embodiment of the present invention, when the first key is the random key acquired by the network device, because neither the first user equipment nor the second user equipment can acquire the random key, the method in this embodiment of the present invention may further include: after the network device sends the message including the first key to the second user equipment, sending, by the network device, a message including the first key to the first user equipment, so that the first user equipment uses, when communicating with the second user equipment by using the D2D link, the first key to protect the transmitted information.

Further, in one situation of this embodiment of the present invention, when the network device and user equipment (e.g. the first user equipment and the second user equipment) exchange the first key, an encrypted connection between the network device and the user equipments may be used to transmit the first key. When the network device is the eNB, encrypted radio resource control (RRC) signaling or an encrypted user-plane data packet may be used to transmit the first key; when the network device is the MME, encrypted non-access stratum (NAS) signaling may be used to transmit the first key; and when the network device is the proximity service server, a transport layer security (TLS) protocol connection between a user equipment and the proximity service server may be used to transmit the first key.

Further, in another situation of this embodiment of the present invention, the network device may generate a third key according to a second key, and encrypt the first key by using the third key, where the second key is a shared key between the network device and the first user equipment; and then send a message including an encrypted first key to the first user equipment. The network device may acquire a fourth key, where the fourth key is a shared key between the network device and the second user equipment, generate a fifth key according to the fourth key, encrypt the first key by using the fifth key, and then send a message including an encrypted first key to the second user equipment.

Further, in another situation of this embodiment of the present invention, the network device and the user equipment may also encrypt messages including the first keys by using an asymmetric encryption technology, so as to ensure that the network device may securely send the second keys to the user equipment. Specifically, the network device receives public keys (e.g. a first public key and a second public key) from the user equipment (including the first user equipment and the second user equipment); the network device encrypts the first key by using the public keys (the first public key and the second public key); and the network device sends, messages including encrypted first keys to the user equipment, so that the user equipment may decrypt, according to private keys (a first private key and a second private key) reserved by the user equipment, the encrypted first keys to acquire the first keys. The first public key and the first private key that is reserved by the first user equipment form a first public-private key pair, and the second public key and the second private key that is reserved by the second user equipment form a second public-private key pair.

It should be noted that, when data transmitted between the first user equipment and the second user equipment through the D2D link includes only user-plane data, the first user equipment and the second user equipment may directly encrypt or decrypt the transmitted information according to the first keys received from the network device.

Further optionally, when data transmitted between the first user equipment and the second user equipment through the D2D link includes not only user-plane data but also control-plane data, the user equipment may further generate an encryption key and an integrity protection key according to the first keys, so as to ensure that the user-plane data and the control-plane data not to be midway damaged or distorted.

According to the key exchange method provided by this embodiment of the present invention, a network device acquires a first key, and sends a message including the first key to a second user equipment, so that the second user equipment uses, when communicating with a first user equipment by using a D2D link, the first key to protect transmitted information. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 3:
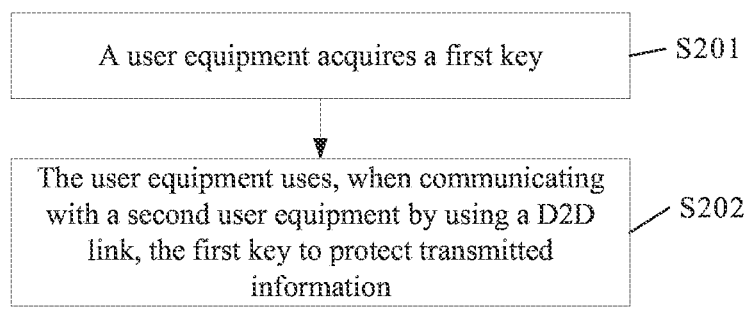
FIG. 3 is a flowchart of a key exchange method according to another embodiment of the present invention.

Another embodiment of the present invention provides a key exchange method. As shown in FIG. 3, the method includes the following.

S201: A user equipment acquires a first key.

In one application scenario of this embodiment of the present invention, a method used by the user equipment to acquire the first key may include: acquiring, by the user equipment, a second key, where the second key is a shared key between a network device and the user equipment; and generating the first key according to the second key by using a key derivation function.

In another application scenario of this embodiment of the present invention, a method used by the user equipment to acquire the first key may include: receiving, by the user equipment, a message that is from a network device and includes the first key.

Further, in this application scenario, the method in this embodiment of the present invention may further include: receiving, by the user equipment, the first key by using an encrypted connection between the user equipment and the network device; or deducing, by the user equipment, a third key by using a shared key between the user equipment and the network device, and decrypting the received first key by using the third key; or sending, by the user equipment, a public key to the network device, so that the network device encrypts the first key by using the public key, and the network device sends a message including an encrypted first key to the user equipment, where the public key and a private key that is reserved by the user equipment form a public-private key pair.

Further, after the user equipment acquires the first key, the method in this embodiment of the present invention may further include: receiving, by the user equipment, a cryptographic algorithm from the network device, where the cryptographic algorithm includes an encryption algorithm and/or an integrity protection algorithm.

Further, the user equipment may generate an encryption key according to the first key and the encryption algorithm, and generate an integrity protection key according to the first key and the integrity protection algorithm.

S202: The user equipment uses, when communicating with a second user equipment by using a D2D link, the first key to protect transmitted information.

Specifically, when data transmitted between a first user equipment and the second user equipment through the D2D link includes only user-plane data, the first user equipment and the second user equipment may encrypt the transmitted data according to the first key.

When data transmitted between the first user equipment and the second user equipment through the D2D link includes not only user-plane data but also control-plane data, the user equipment (including the first user equipment and the second user equipment) may encrypt, by using the encryption key generated according to the first key and the cryptographic algorithm, the data transmitted on the D2D link; and perform, by using the integrity protection key generated according to the first key and the integrity protection algorithm, integrity protection on the data transmitted on the D2D link.

Further, the user equipment may generate the encryption key according to the first key and the encryption algorithm, and generate the integrity protection key according to the first key and the integrity protection algorithm. Therefore, correspondingly, that the user equipment uses the first key to protect the data transmitted on the D2D link may specifically include the following: The user equipment encrypts, by using the encryption key and the encryption algorithm, the information transmitted on the D2D link, and performs, by using the integrity protection key and the integrity protection algorithm, integrity protection on the information transmitted on the D2D link.

The cryptographic algorithm is a cryptographic algorithm that is determined in a pre-stored cryptographic algorithm list by the network device, that is applicable to the user equipment and a user equipment, and whose priority is highest, where a D2D link is established between the two user equipment. The network device may determine, according to the pre-stored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list; and send the cryptographic algorithm to the first user equipment and the second user equipment. The security capability of the first user equipment is used to indicate a cryptographic algorithm applicable to the first user equipment, and the security capability of the second user equipment is used to indicate a cryptographic algorithm applicable to the second user equipment. The network device may prestore the security capabilities of a first user electronic device and a second user electronic device.

According to the key exchange method provided by this embodiment of the present invention, a user equipment acquires a first key, and uses the first key to protect information transmitted on a D2D link. The user equipment uses the first key to protect the information transmitted on the D2D link, which can avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 4:
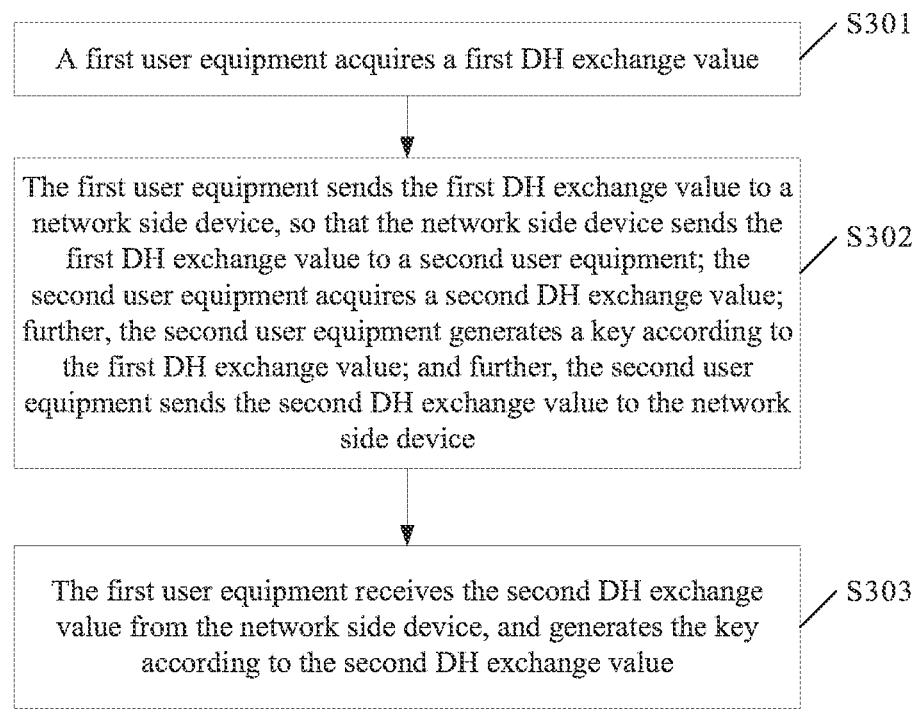
FIG. 4 is a flowchart of a key exchange method according to another embodiment of the present invention.

Another embodiment of the present invention provides a key exchange method, where a D2D link is established between a first user equipment and a second user equipment. As shown in FIG. 4, the method includes the following.

S301: The first user equipment acquires a first Diffie-Hellman (DH) exchange value.

Specifically, a method used by the first user equipment to acquire the first DH exchange value may include: acquiring, by the first user equipment, a first natural number, a prime number parameter, and a primitive root parameter; and generating the first DH exchange value according to the first natural number, the prime number parameter, and the primitive root parameter.

The first natural number is a natural number randomly acquired by the first user equipment, and the first natural number may be one of all natural numbers; the prime number parameter refers to a number that is one of all natural numbers greater than 1 and cannot be divisible by another natural number other than 1 and the parameter itself; and the primitive root parameter may be a random natural number that equals to neither 0 nor 1.

S302: The first user equipment sends the first DH exchange value to a network device, so that the network device sends the first DH exchange value to the second user equipment; the second user equipment acquires a second DH exchange value; further, the second user equipment generates a key according to the first DH exchange value; and further, the second user equipment sends the second DH exchange value to the network device.

Specifically, a method used by the second user equipment to acquire the second DH exchange value may include: acquiring, by the second user equipment, a second natural number, a prime number parameter, and a primitive root parameter; and generating the second DH exchange value according to the second natural number, the prime number parameter, and the primitive root parameter. The second natural number is similar to the first natural number, and may be a natural number randomly acquired by the second user equipment; the prime number parameter and the primitive root parameter may be shared parameters of the second user equipment and the first user equipment, or be parameters received from the first user equipment by the second user equipment through the network device.

The key is used to protect data transmitted on the D2D link.

S303: The first user equipment receives the second DH exchange value from the network device, and generates the key according to the second DH exchange value.

Specifically, a method used by the first user equipment to generate an key according to the second DH exchange value may include: generating, by the first user equipment, the key according to the second DH exchange value, the first natural number, and the prime number parameter.

According to the key exchange method provided by this embodiment of the present invention, a first user equipment acquires a first DH exchange value, and then sends the first DH exchange value to a network device, so that the network device sends the first DH exchange value to a second user equipment; the second user equipment acquires a second DH exchange value; further, the second user equipment generates a key according to the first DH exchange value; the second user equipment sends the second DH exchange value and an identifier of the first user equipment to the network device; and finally, the first user equipment receives the second DH exchange value from the network device, and generates the key according to the second DH exchange value. A problem exists that information is tampered with because there is no corresponding security mechanism when a user equipment (UE) transmits service data or a signaling message through a Ud interface still exists; however, in this embodiment, the first user equipment and the second user equipment may generate a same shared key by using a shared parameter and a random natural number, so that user equipments establishing a D2D link share a set of keys, and further, information security can be achieved when a user equipment transmits service data or a signaling message through a Ud interface.

Figure 5:
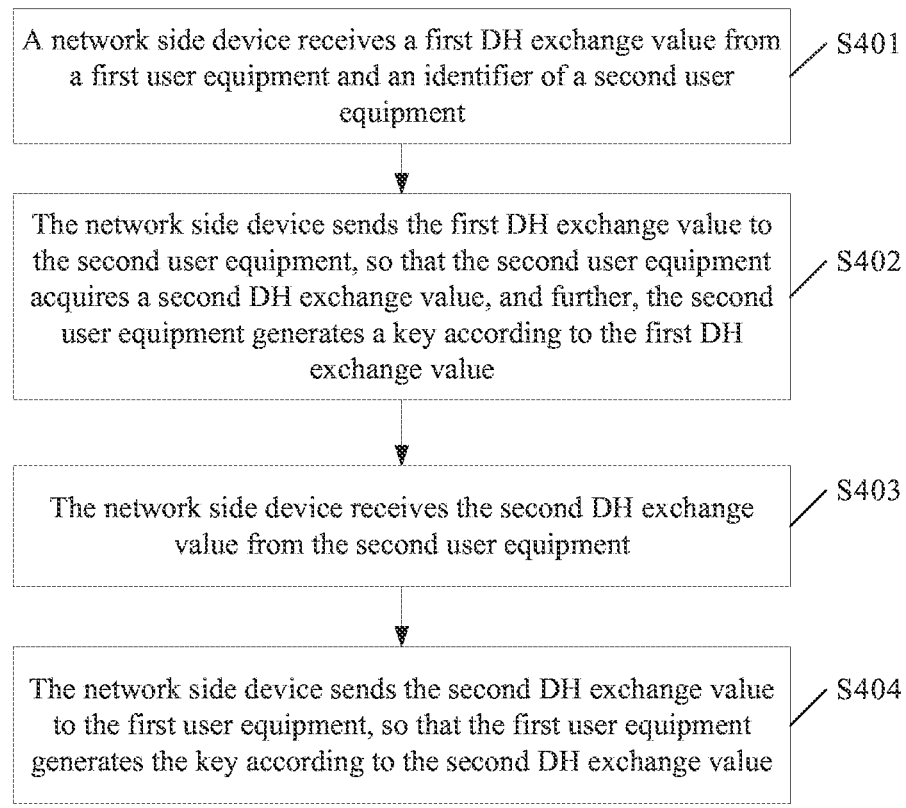
FIG. 5 is a flowchart of a key exchange method according to another embodiment of the present invention.

Another embodiment of the present invention provides a key exchange method, where a D2D link is established between a first user equipment and a second user equipment. As shown in FIG. 5, the method includes the following.

S401: A network device receives a first DH exchange value from the first user equipment.

Specifically, the network device may be: an evolved Node B (eNB), a mobility management entity (MME), or a proximity service server.

S402: The network device sends the first DH exchange value to the second user equipment, so that the second user equipment acquires a second DH exchange value, and further, the second user equipment generates a key according to the first DH exchange value.

S403: The network device receives the second DH exchange value from the second user equipment.

S404: The network device sends the second DH exchange value to the first user equipment, so that the first user equipment generates the key according to the second DH exchange value.

In this embodiment, the network device may forward, between the first user equipment and the second user equipment, shared parameters (including a first DH exchange value, a prime number parameter, a primitive root parameter, and a second DH exchange value) of the first user equipment and the second user equipment by using an RRC signaling message, a NAS message, and the like, so that the first user equipment and the second user equipment may generate encryption keys according to the shared parameters and random natural numbers that are acquired by the first user equipment and the second user equipment. For the RRC signaling message, the NAS message, and the like, an integrity protection key and an encryption key that are between a user equipment and the network device may be used to protect transmitted data, so as to ensure that the shared parameters of the first user equipment and the second user equipment not to be tampered with by a third party device.

According to the key exchange method provided by this embodiment of the present invention, a network device receives a first DH exchange value from a first user equipment, and sends the first DH exchange value to a second user equipment, so that the second user equipment acquires a second DH exchange value, and further, the second user equipment generates a key according to the first DH exchange value; then the network device receives the second DH exchange value from the second user equipment, and finally sends the second DH exchange value to the first user equipment, so that the first user equipment generates the key according to the second DH exchange value. Compared with a problem that information is tampered with because there is no corresponding security mechanism when a user equipment (UE) transmits service data or a signaling message through a Ud interface, the network device may forward an exchange value between the first user equipment and the second user equipment, so that the first user equipment and the second user equipment generate a shared key, which can enable user equipment establishing a D2D link to share a set of keys; and further, information security can be achieved when a user equipment transmits service data or a signaling message through a Ud interface.

Figure 6:
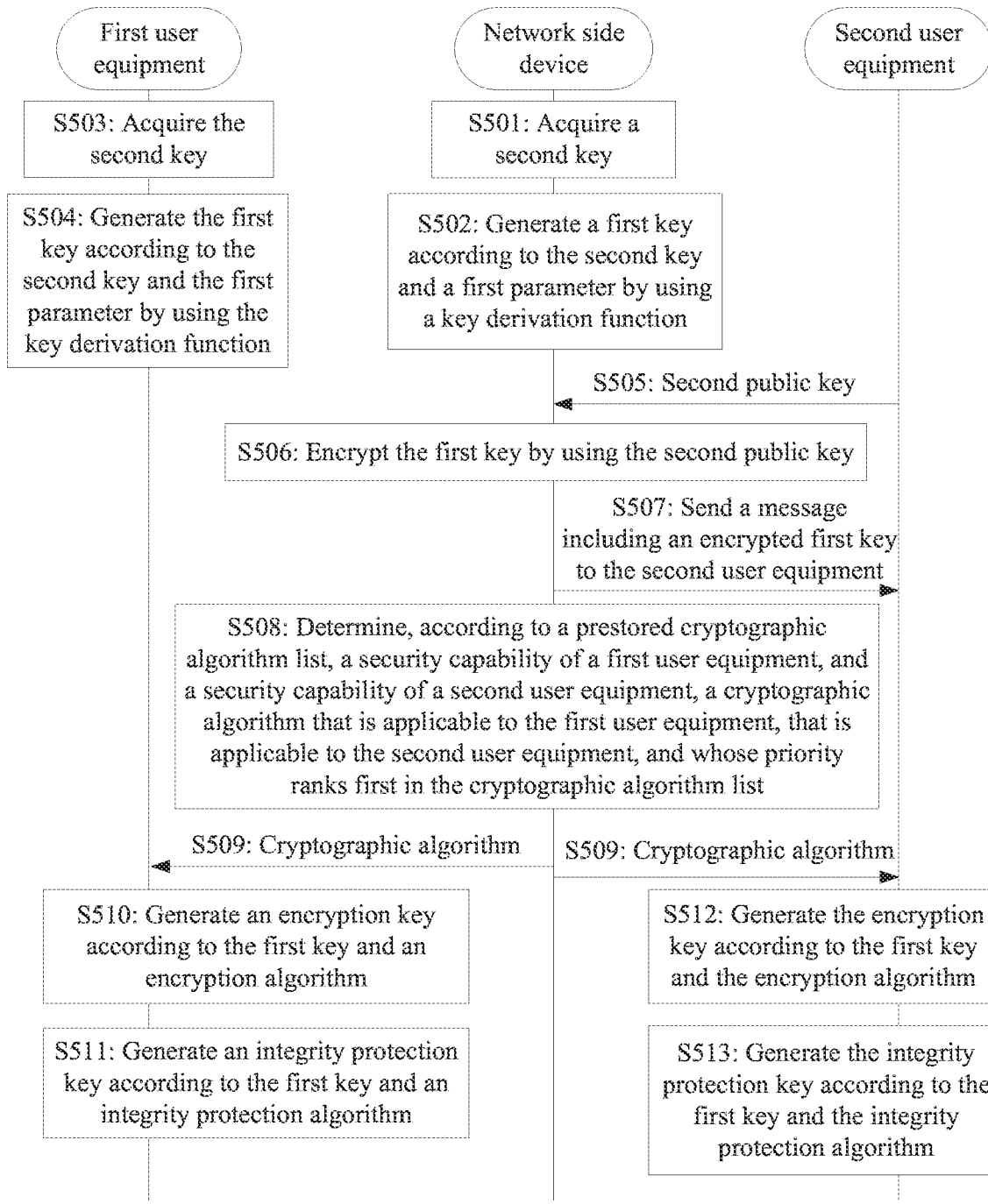
FIG. 6 is a flowchart of a key exchange method according to another embodiment of the present invention.

Another embodiment of the present invention provides a key exchange method, where a D2D link is established between a first user equipment and a second user equipment. As shown in FIG. 6, the method includes the following.

S501: A network device acquires a second key.

Specifically, the second key is a shared key KeNB between an evolved Node B (eNB) and the first user equipment; or the second key is a shared key KASME between a mobility management entity (MME) and the first user equipment; or the second key is a shared key Kprox between a proximity service server and the first user equipment.

S502: The network device generates a first key according to the second key and a first parameter by using a key derivation function.

Specifically, when the network device is an evolved Node B (eNB), the second key is a shared key between the eNB and the first user equipment, and the first parameter includes a packet data convergence protocol (PDCP) serial number between the eNB and the first user equipment; when the network device is a mobility management entity (MME), the second key is a shared key between the MME and the first user equipment, and the first parameter includes a non-access stratum message serial number between the MME and the first user equipment; when the network device is a proximity service server, the first parameter is a random number generated by the proximity service server.

Exemplarily, the key derivation function (KDF) may be used to derive input keys of various algorithms; for example, the first user equipment may use the second key and the first parameter as input parameters, to generate the first key by using the key derivation function. Specifically, that the eNB is the network device is used as an example, for example, Kud=KDF ($K_{eNB}$, MAX{PDCP COUNT}), where Kud is the first key, $K_{eNB}$ is the second key, and MAX{PDCP COUNT} is the first parameter.

It should be noted that, the key derivation function used in this embodiment of the present invention includes but is not limited to the KDF function enumerated above, and the key derivation function used in this embodiment of the present invention may further include another key derivation function.

S503: The first user equipment acquires the second key.

In this embodiment, because the second key is a shared key between the network device and the first user equipment, the network device does not need to send the second key to the first user equipment. Instead, the first user equipment acquires the second key by itself, and the second key is also the shared key between the network device and the first user equipment.

S504: The first user equipment generates the first key according to the second key and the first parameter by using the key derivation function.

Specifically, for a specific method used by the first user equipment to generate the first key according to the second key and the first parameter by using the key derivation function, reference may be made to the method used by the network device to generate the first key according to the second key and the first parameter by using the key derivation function. A user equipment and a network device may share a key derivation function in advance, so that the user equipment and the network device may generate a same first key according to the same key derivation function.

It should be noted that, in this embodiment, S501 to S502 may be first executed, and then S503 to S504 are executed; or S503 to S504 may be first executed, and then S501 to S502 are executed; or S501 to S502 and S503 to S504 may be executed at the same time. A sequence for executing S501 to S502 and S503 to S504 is not limited in this embodiment of the present invention.

Further optionally, the user equipment and the network device may encrypt the first key by using an asymmetric encryption technology, so as to ensure that the first key is not intercepted by an attacker when the network device sends the first key to the user equipment. Therefore, the method in this embodiment may further include S505 to S507.

S505: The network device receives a second public key from the second user equipment.

S506: The network device encrypts the first key by using the second public key.

The second public key and a second private key that is reserved by the second user equipment form a second public-private key pair.

Specifically, the user equipment may use an existing key generation algorithm to generate a public-private key pair (e.g. the second public-private key pair), and send a public key (e.g. the second public key) to the network device, so that the network device encrypts the first key by using the public key (e.g. the second public key).

Further optionally, in one application scenario of this embodiment of the present invention, S505 to S506 may be replaced with that: the network device acquires a fourth key, where the fourth key is a shared key between the network device and the second user equipment; and the network device generates a fifth key according to the fourth key, and encrypts the first key by using the fifth key.

S507: The network device sends a message including an encrypted first key to the second user equipment, so that the second user equipment uses, when communicating with the first user equipment by using the D2D link, the first key to protect transmitted information.

In this embodiment, the message that is sent by the network device and includes the encrypted first key may be: a message including a first key encrypted by the network device by using the second public key, or a message including a first key encrypted by the network device by using the shared key between the network device and the second user equipment.

Further optionally, in another application scenario of this embodiment of the present invention, S507 may be replaced with that: the network device sends a message including the first key to the second user equipment by using an encrypted connection between the network device and the second user equipment. Specifically, for a specific form of the encrypted connection between the network device and the second user equipment, reference may be made to related descriptions in other embodiments, and details are not repeatedly described in this embodiment of the present invention.

Further optionally, when data transmitted by the first user equipment and the second user equipment through the D2D link includes not only user-plane data but also control-plane data, the first user equipment and the second user equipment need to generate an integrity protection key and an encryption key according to the first key and a cryptographic algorithm by using a key derivation function, so as to ensure integrity of the data on the D2D link. Therefore, the method in this embodiment of the present invention may further include S508 to S509.

S508: The network device determines, according to a pre-stored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list.

The security capability of the first user equipment is used to indicate a cryptographic algorithm applicable to the first user equipment, and the security capability of the second user equipment is used to indicate a cryptographic algorithm applicable to the second user equipment.

S509: The network device sends the cryptographic algorithm to the first user equipment and the second user equipment.

Specifically, the cryptographic algorithm includes an encryption algorithm and/or an integrity protection algorithm. The method in this embodiment may further include S510 to S513.

S510: The first user equipment generates an encryption key according to the first key and an encryption algorithm.

The encryption algorithm is used to encrypt information transmitted on the D2D link.

S511: The first user equipment generates an integrity protection key according to the first key and an integrity protection algorithm.

The integrity protection algorithm is used to perform integrity protection on the information transmitted on the D2D link.

Exemplarily, if the key derivation function is KDF, the integrity protection key generated by the first user equipment according to the first key and the cryptographic algorithm by using the key derivation function may specifically be Kud_enc=KDF (Kud, alg.id), and the encryption key generated by the first user equipment according to the first key and the cryptographic algorithm by using the key derivation function may specifically be Kud_int=KDF (Kud, alg.id), where Kud_enc is the integrity protection key, Kud_int is the encryption key, Kud is the first key, and alg.id is the cryptographic algorithm.

S512: The second user equipment generates the encryption key according to the first key and the encryption algorithm.

S513: The second user equipment generates the integrity protection key according to the first key and the integrity protection algorithm.

It should be noted that, a specific method used by a user equipment to generate an integrity protection key and an encryption key includes but is not limited to the foregoing enumerated method for generating the key, another method for generating an integrity protection key and an encryption key is not repeatedly described in this embodiment.

A specific method used by the second user equipment to generate the integrity protection key and the encryption key according to the first key and the cryptographic algorithm by using the key derivation function is similar to the method used by the first user equipment to generate the integrity protection key and the encryption key according to the first key and the cryptographic algorithm by using the key derivation function, and details are not repeatedly described in this embodiment.

In one application scenario of this embodiment of the present invention, if the network device is not a network device serving the second user equipment, that the second user equipment receives the message that is from the network device and includes the first key may specifically include that: the second user equipment receives a message that is from the network device serving the second user equipment and includes the first key, where the message including the first key is received from the network device by the network device serving the second user equipment. The second user equipment may also receive a message that is from the network device serving the second user equipment and includes an encrypted first key.

After the first user equipment and the second user equipment generate the encryption key and the integrity protection key according to the first key and the cryptographic algorithm, the user equipment may encrypt, by using the encryption key and the encryption algorithm, the information transmitted on the D2D link; and the user equipment may perform, by using the integrity protection key and the integrity protection algorithm, integrity protection on the information transmitted on the D2D link.

According to the key exchange method provided by this embodiment of the present invention, a network device acquires a first key, and sends a message including the first key to a second user equipment, so that the second user equipment uses, when communicating with a first user equipment by using a D2D link, the first key to protect transmitted information. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 7:
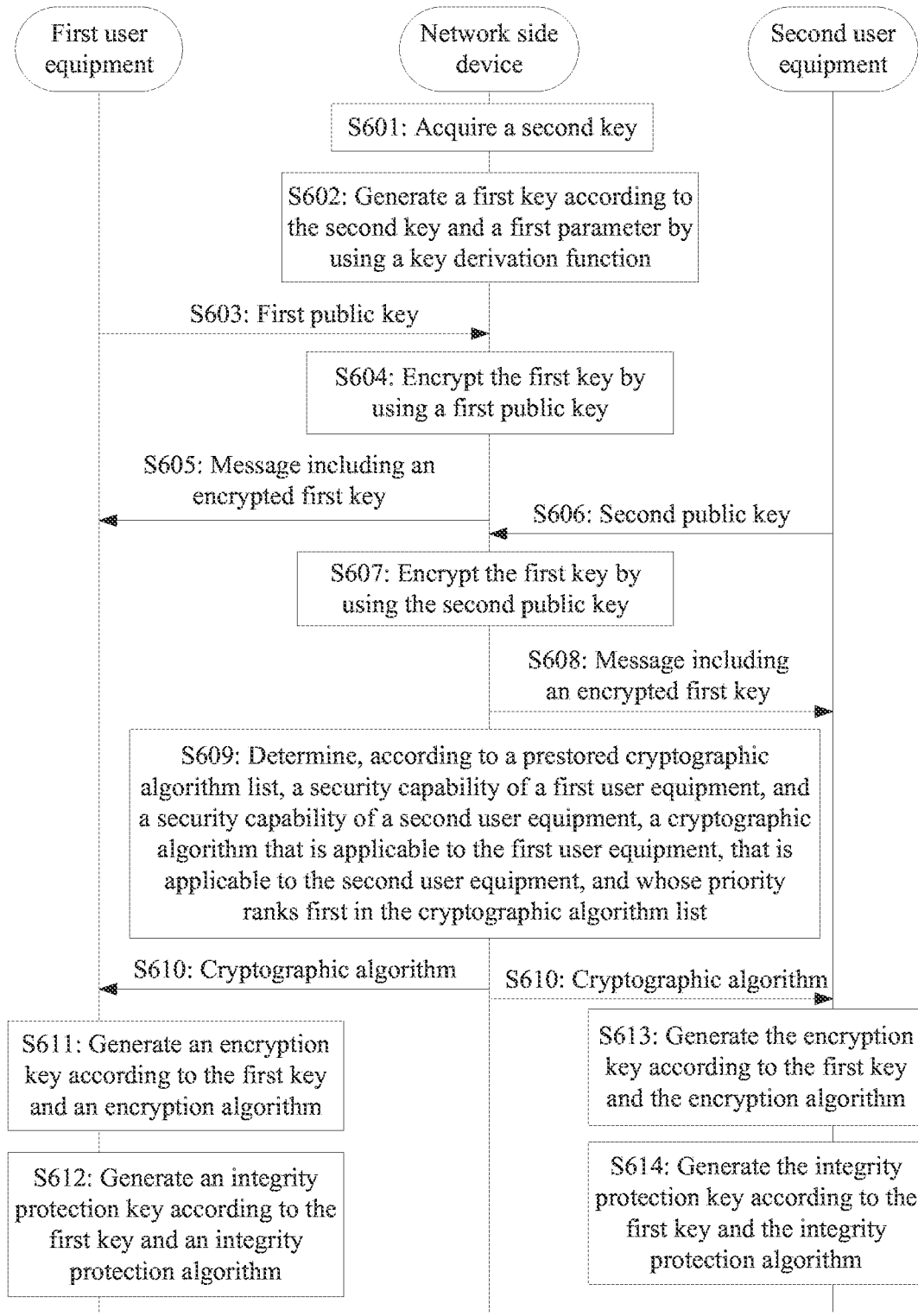
FIG. 7 is a flowchart of a key exchange method according to another embodiment of the present invention.

Another embodiment of the present invention provides a key exchange method, where a D2D link is established between a first user equipment and a second user equipment. As shown in FIG. 7, the method includes the following.

S601: A network device acquires a second key.

In this embodiment, a second key is a random key acquired by the network device, where the random key may be a piece of random code or a segment of a random string; or a second key is a key deduced by the network device according to identities of the first user equipment and the second user equipment by using a key derivation function.

S602: The network device generates a first key according to the second key and a first parameter by using a key derivation function.

Further optionally, user equipment and the network device may encrypt the first key by using an asymmetric encryption technology, so as to ensure that the first key is not tampered with when the network device sends the first key to the user equipment. Therefore, the method in this embodiment may further include S603 to S608.

S603: The network device receives a first public key from the first user equipment.

In this embodiment, because the user equipment do not acquire the second key, the user equipment cannot generate the first key according to the second key. Therefore, the user equipment (including the first user equipment and the second user equipment) need to receive the first key from the network device. In this case, the user equipment (including the first user equipment and the second user equipment) both need to send a public key to the network device. The first user equipment sends the first public key to the network device, and the second user equipment sends a second public key to the network device.

S604: The network device encrypts the first key by using the first public key.

The first public key and a first private key that is reserved by the first user equipment form a first public-private key pair.

Further optionally, in one application scenario of this embodiment of the present invention, S603 to S604 may be replaced with that: the network device generates a third key according to a second key; and the network device encrypts the first key by using the third key, where the second key is a shared key between the network device and the first user equipment.

S605: The network device sends a message including an encrypted first key to the first user equipment, so that the first user equipment uses, when communicating with the second user equipment by using the D2D link, the first key to protect transmitted information.

In this embodiment, the message that is sent by the network device and includes the encrypted first key may include: a message including a first key encrypted by the network device by using the first public key, or a message including a first key encrypted by the network device by using the shared key between the network device and the first user equipment.

Further optionally, in another application scenario of this embodiment of the present invention, S605 may be replaced with that: the network device sends a message including the first key to the first user equipment by using an encrypted connection between the network device and the first user equipment. Specifically, for a specific form of the encrypted connection between the network device and the first user equipment, reference may be made to a specific form of an encrypted connection between the network device and the second user equipment, and details are not repeatedly described in this embodiment of the present invention.

S606: The network device receives a second public key from the second user equipment.

S607: The network device encrypts the first key by using the second public key.

The second public key and a second private key that is reserved by the second user equipment form a second public-private key pair.

Further optionally, in one application scenario of this embodiment of the present invention, S606 to S607 may be replaced with that: the network device acquires a fourth key, where the fourth key is a shared key between the network device and the second user equipment; and the network device generates a fifth key according to the fourth key, and encrypts the first key by using the fifth key.

S608: The network device sends a message including the encrypted first key to the second user equipment, so that the second user equipment uses, when communicating with the first user equipment by using the D2D link, the first key to protect the transmitted information.

In this embodiment, the message that is sent by the network device and includes the encrypted first key may include: a message including a first key encrypted by the network device by using the second public key, or a message including a first key encrypted by the network device by using the shared key between the network device and the second user equipment.

Further optionally, in another application scenario of this embodiment of the present invention, S608 may be replaced with that: the network device sends a message including the first key to the second user equipment by using an encrypted connection between the network device and the second user equipment. Specifically, for a specific form of the encrypted connection between the network device and the second user equipment, reference may be made to related descriptions in other embodiments, and details are not repeatedly described in this embodiment of the present invention.

In this embodiment, the network device acquires the first key, and distributes the first key to the first user equipment and the second user equipment; therefore, the first user equipment and second user equipment do not need to acquire the first key by themselves.

It should be noted that, in this embodiment, S603 to S605 may be first executed, and then S606 to S608 may be executed; or S606 to S608 may be first executed, and then S603 to S605 may be executed; or S603 to S605 and S606 to S608 may be executed at the same time. A sequence for executing S603 to S605 and S606 to S608 is not limited in this embodiment of the present invention.

Further optionally, when data transmitted by the first user equipment and the second user equipment through the D2D link includes not only user-plane data but also control-plane data, the first user equipment and the second user equipment need to generate an integrity protection key and an encryption key according to the second key and a cryptographic algorithm by using a key derivation function, so as to ensure integrity of the data on the D2D link. Therefore, the method in this embodiment of the present invention may further include S609 to S614.

S609: The network device determines, according to a prestored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list.

S610: The network device sends the cryptographic algorithm to the first user equipment and the second user equipment.

S611: The first user equipment generates an encryption key according to the first key and an encryption algorithm.

S612: The first user equipment generates an integrity protection key according to the first key and an integrity protection algorithm.

S613: The second user equipment generates the encryption key according to the first key and the encryption algorithm.

S614: The second user equipment generates the integrity protection key according to the first key and the integrity protection algorithm.

In one application scenario of this embodiment of the present invention, if the network device is not a network device serving a user equipment (the first user equipment or the second user equipment), that the user equipment receives the message that is from the network device and includes the first key may specifically include the following. The user equipment receives a message that is from the network device serving the user equipment and includes the first key, where the message including the first key is received from the network device by the network device serving the user equipment. The user equipment may also receive a message that is from the network device serving the user equipment and includes an encrypted first key.

After the first user equipment and the second user equipment generate the encryption key and the integrity protection key according to the first key and the cryptographic algorithm, when transmitting data through the D2D link, the first user equipment and the second user equipment may encrypt, by using the encryption key, the information transmitted on the D2D link, and perform, by using the integrity protection key, integrity protection on the information transmitted on the D2D link, so as to prevent the data from being tampered with in a transmission process.

According to the key exchange method provided by this embodiment of the present invention, a network device acquires a first key, and sends a message including the first key to a second user equipment, so that the second user equipment uses, when communicating with a first user equipment by using a D2D link, the first key to protect transmitted information. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 8:
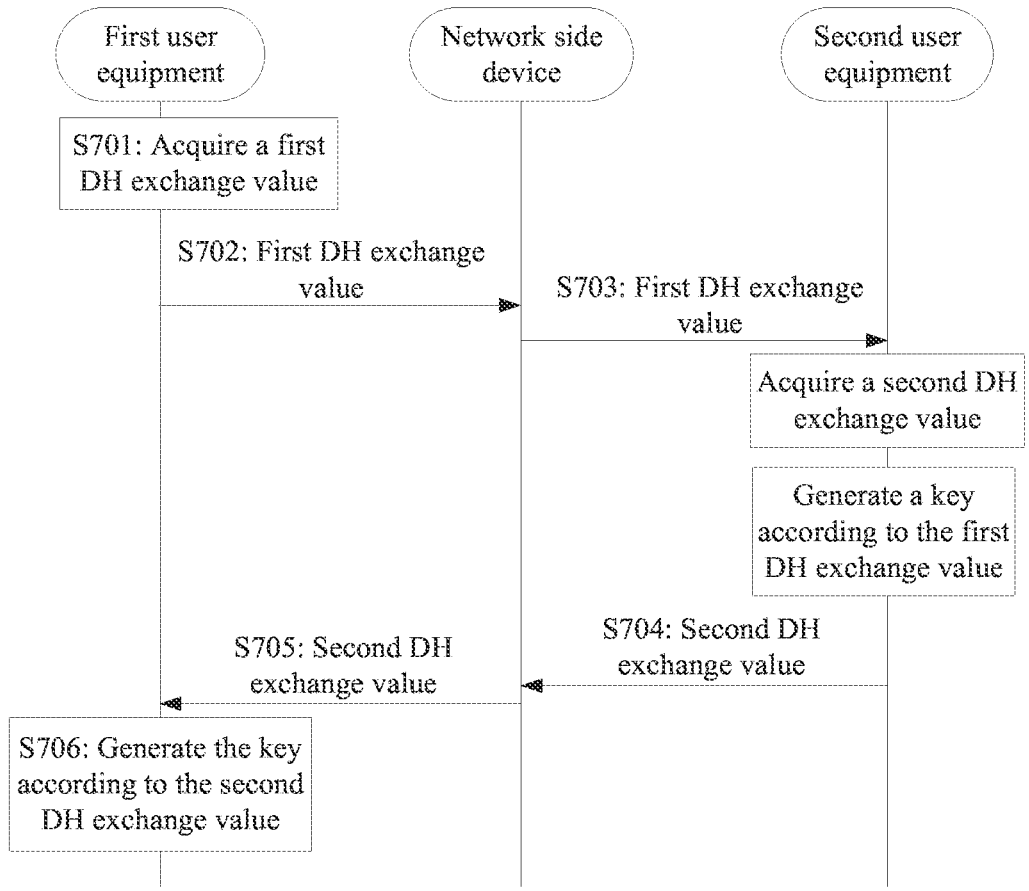
FIG. 8 is a flowchart of a key exchange method according to another embodiment of the present invention.

Another embodiment of the present invention provides a key exchange method, where a D2D link is established between a first user equipment and a second user equipment. As shown in FIG. 8, the method includes the following.

S701: The first user equipment acquires a first DH exchange value.

The first user equipment may acquire a first natural number, a prime number parameter, and a primitive root parameter, and generates the first DH exchange value according to the first natural number, the prime number parameter, and the primitive root parameter.

Exemplarily, the first user equipment generates the first DH exchange value according to $A=(g^a \bmod p)$, where A is the first DH exchange value, a is the first natural number, g is the primitive root parameter, and p is the prime number parameter.

S702: The first user equipment sends the first DH exchange value to a network device.

S703: The network device sends the first DH exchange value to the second user equipment, so that the second user equipment acquires a second DH exchange value, and further, the second user equipment generates a key according to the first DH exchange value.

Specifically, the network device may send the first DH exchange value to the second user equipment according to an identifier of the second user equipment.

Exemplarily, the second user equipment generates a second DH exchange value according to a second natural number, the prime number parameter, and the primitive root parameter, which specifically includes that: the second user equipment generates the second DH exchange value according to $B=(g^b \bmod p)$; and the second user equipment generates the key according to $Kud=(A)^b \bmod p$, where A is the first DH exchange value, B is the second DH exchange value, b is the second natural number, g is the primitive root parameter, p is the prime number parameter, and Kud is the key.

S704: The network device receives the second DH exchange value from the second user equipment.

S705: The network device sends the second DH exchange value to first user equipment.

Specifically, the network device may send the second DH exchange value to the first user equipment according to an identifier of the first user equipment.

S706: The first user equipment generates the key according to the second DH exchange value.

Exemplarily, the first user equipment generates the key according to a second DH exchange value, the first natural number, and the prime number parameter, which may be that: the first user equipment generates the key according to $Kud=(B)^a \bmod p$, where B is the second DH exchange value, a is the first natural number, p is the prime number parameter, and Kud is the key.

In this embodiment, traditional DH exchange is used to generate a shared key, and another DH exchange manner based on an elliptic curve may also be used to generate the shared key.

According to the key exchange method provided by this embodiment of the present invention, a first user equipment acquires a first DH exchange value, and then sends the first DH exchange value to a network device, so that the network device sends the first DH exchange value to a second user equipment. The second user equipment acquires a second DH exchange value; further, the second user equipment generates a key according to the first DH exchange value; the second user equipment sends the second DH exchange value and an identifier of the first user equipment to the network device. Finally, the first user equipment receives the second DH exchange value from the network device, and generates the key according to the second DH exchange value. Compared with a problem that information is tampered with because there is no corresponding security mechanism when a user equipment (UE) transmits service data or a signaling message through a Ud interface, the first user equipment and the second user equipment may generate a same shared key by using a shared parameter and a random natural number, so that user equipment establishing a D2D link share a set of keys, and further, information security can be achieved when a user equipment transmits service data or a signaling message through a Ud interface.

Figure 9:
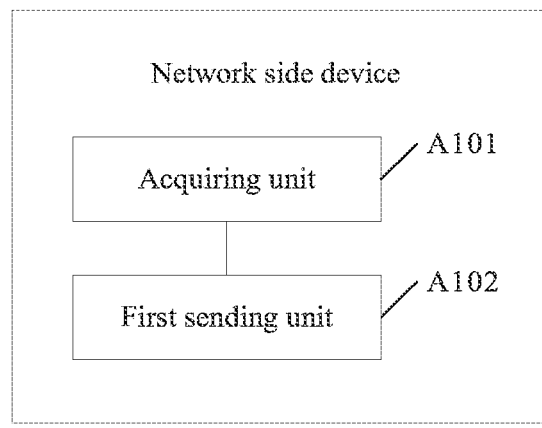
FIG. 9 is a schematic composition diagram of a network device according to another embodiment of the present invention.

Another embodiment of the present invention provides a network device, where a D2D link is established between a first user equipment and a second user equipment. As shown in FIG. 9, the network device includes an acquiring unit A101 and a first sending unit A102.

The acquiring unit A101 is configured to acquire a first key.

The first sending unit A102 is configured to send a message including the first key to the second user equipment, so that the second user equipment uses, when communicating with the first user equipment by using the D2D link, the first key to protect transmitted information.

Further, in a first application scenario of this embodiment, the network device is: an evolved Node B (eNB), a mobility management entity (MME), or a proximity service server.

Further, in a second application scenario of this embodiment, the acquiring unit A101 includes: an acquiring module A1011, configured to acquire a second key; and a generating module A1012, configured to generate the first key according to the second key by using a key derivation function.

Further, when the network device is an evolved Node B (eNB), the second key is a shared key between the eNB and the first user equipment; when the network device is a mobility management entity (MME), the second key is a shared key between the MME and the first user equipment; when the network device is a proximity service server, the second key is a shared key between the proximity service server and the first user equipment.

Further, the generating module A1012 is further configured to generate the first key according to the second key and a first parameter by using the key derivation function.

The first parameter includes a packet data convergence protocol (PDCP) serial number between the eNB and the first user equipment, or the first parameter includes a non-access stratum message serial number between the MME and the first user equipment, or the first parameter includes a random number generated by the network device.

Further, the first key is a random key acquired by the network device.

The network device further includes a second sending unit A103.

The second sending unit A103 is configured to: after the acquiring unit A101 acquires the first key, send a message including the first key to the first user equipment, so that the first user equipment uses, when communicating with the second user equipment by using the D2D link, the first key to protect the transmitted information.

Further, in one application scenario of this embodiment of the present invention, the network device further includes a first receiving unit A104 and a first encrypting unit A105.

The first receiving unit A104 is configured to: before the second sending unit A103 sends the message including the first key to the first user equipment, receive a first public key from the first user equipment.

The first encrypting unit A105 is configured to encrypt the message including the first key by using the first public key received by the first receiving unit A104.

The second sending unit A103 is further configured to send a message including a first key encrypted by the first encrypting unit A105 to the first user equipment.

The first public key and a first private key that is reserved by the first user equipment form a first public-private key pair.

Alternatively, in this application scenario, the network device further includes: a first generating unit A106 and a first encrypting unit A105.

The first generating unit A106 is configured to: before the second sending unit A103 sends the message including the first key to the first user equipment, generate a third key according to a second key.

The first encrypting unit A105 is configured to encrypt the first key by using the third key generated by the first generating unit A106, where the second key is a shared key between the network device and the first user equipment.

The second sending unit A103 is further configured to send a message including a first key encrypted by the first encrypting unit A105 to the first user equipment.

Further, the second sending unit A103 is further configured to send the message including the first key to the first user equipment by using an encrypted connection between the network device and the first user equipment.

Further, in another application scenario of this embodiment of the present invention, the network device may further include a second receiving unit A107 and a second encrypting unit A108.

The second receiving unit A107 is configured to: before the first sending unit A102 sends the message including the first key to the second user equipment, receive a second public key from the second user equipment.

The second encrypting unit A108 is configured to encrypt the message including the first key by using the second public key received by the second receiving unit A107.

The second public key and a second private key that is reserved by the second user equipment form a second public-private key pair.

Alternatively, in this application scenario, the network device further includes: a second generating unit A109 and a second encrypting unit A108.

The second generating unit A109 is configured to: before the first sending unit 102 sends the message including the first key to the second user equipment, acquire a fourth key, and generate a fifth key according to the fourth key.

The second encrypting unit A108 is configured to encrypt the first key by using the fifth key generated by the second generating unit.

The fourth key is a shared key between the network device and the second user equipment.

The first sending unit A102 is further configured to send a message including a first key encrypted by the second encrypting unit A108 to the second user equipment.

Further, the first sending unit A102 is further configured to send the message including the first key to the second user equipment by using an encrypted connection between the network device and the second user equipment.

Further, the network device may further include a determining unit A110 and a third sending unit A111.

The determining unit A110 is configured to determine, according to a pre-stored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list.

The third sending unit A111 is configured to send the cryptographic algorithm to the first user equipment and the second user equipment.

The security capability of the first user equipment is used to indicate a cryptographic algorithm applicable to the first user equipment, and the security capability of the second user equipment is used to indicate a cryptographic algorithm applicable to the second user equipment.

Further, the cryptographic algorithm includes an encryption algorithm and/or an integrity protection algorithm, where the encryption algorithm is used to encrypt data transmitted on the D2D link, and the integrity protection algorithm is used to perform integrity protection on information transmitted on the D2D link.

Further, the first sending unit A102 is further configured to: if the network device is not a network device serving the second user equipment, send the message including the first key to the network device serving the second user equipment, so that the network device serving the second user equipment forwards the message including the first key to the second user equipment.

It should be noted that, for detailed descriptions of some functional modules of the network device provided by this embodiment of the present invention, reference may be made to corresponding content in the method embodiments, and details are not repeatedly described in this embodiment.

The network device provided by this embodiment of the present invention acquires a first key, and sends a message including the first key to a second user equipment, so that the second user equipment uses, when communicating with a first user equipment by using a D2D link, the first key to protect transmitted information. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface. The first key is acquired, and then the message including the first key is sent to the second user equipment, so that the second user equipment uses, when transmitting data to the first user equipment through the D2D link, the first key to protect the data. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 10:
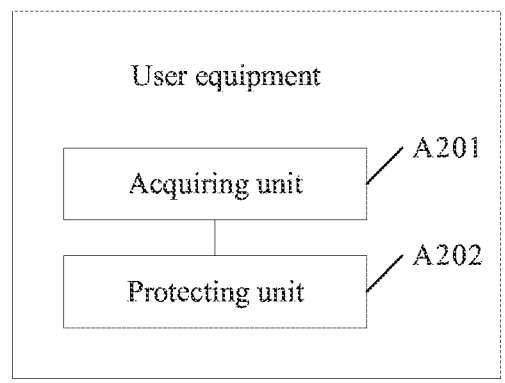
FIG. 10 is a schematic composition diagram of a user equipment according to another embodiment of the present invention.

Another embodiment of the present invention provides a user equipment, where a D2D link is established between the user equipment and a second user equipment. As shown in FIG. 10, the user equipment includes an acquiring unit A201 and a protecting unit A202.

The acquiring unit A201 is configured to acquire a first key.

The protecting unit A202 is configured to use, when communicating with a second user equipment by using the D2D link, the first key to protect transmitted information.

Further, the user equipment may further include a receiving unit A203.

The receiving unit A203 is configured to: after the acquiring unit A201 acquires the first key, receive a cryptographic algorithm from a network device, where the network device is an evolved Node B (eNB), a mobility management entity (MME), or a proximity service server, and the cryptographic algorithm includes an encryption algorithm and/or an integrity protection algorithm.

Further, the user equipment may further include a first generating unit A204 and a second generating unit A205.

The first generating unit A204 is configured to generate an encryption key according to the first key acquired by the acquiring unit A201 and an identifier of the encryption algorithm received by the receiving unit.

The second generating unit A205 is configured to generate an integrity protection key according to the first key acquired by the acquiring unit A201 and an identifier of the integrity protection algorithm received by the receiving unit.

Further, the protecting unit A202 includes an encrypting module A2021 and a protecting module A2022.

The encrypting module A2021 is configured to encrypt, by using the encryption key and the encryption algorithm, information transmitted on the D2D link.

The protecting module A2022 is configured to perform, by using the integrity protection key and the integrity protection algorithm, integrity protection on the information transmitted on the D2D link.

Further, the acquiring unit A201 includes an acquiring module A2011 and a generating module A2012.

The acquiring module A2011 is configured to acquire a second key, where the second key is a shared key between the network device and the user equipment.

The generating module A2012 is configured to generate the first key according to the second key by using a key derivation function.

Alternatively, the acquiring unit A201 is further configured to receive a message that is from the network device and includes the first key.

Further, when the network device is an evolved Node B (eNB), the second key is a shared key between the eNB and the user equipment.

When the network device is a mobility management entity (MME), the second key is a shared key between the MME and the user equipment.

When the network device is a proximity service server, the second key is a shared key between the proximity service server and the user equipment.

Further, the generating module A2012 is further configured to generate the first key according to the second key and a first parameter by using the key derivation function.

The first parameter includes a packet data convergence protocol (PDCP) serial number between the eNB and the first user equipment, or the first parameter includes a non-access stratum message serial number between the MME and the first user equipment, or the first parameter includes a random number generated by the network device.

Further, the user equipment may further include a sending unit A2o6.

The sending unit A2o6 is configured to: before the acquiring unit A201 receives the message that is from the network device and includes the first key, send a public key to the network device, so that the network device encrypts the first key by using the public key, where the public key and a private key that is reserved by the user equipment form a public-private key pair.

Further, the acquiring unit A201 is further configured to receive a message that is from the network device and includes a first key encrypted by using the public key.

Further, the acquiring unit A201 is further configured to receive, by using an encrypted connection between the user equipment and the network device, the message that is from the network device and includes the first key.

Further, the acquiring unit A201 is further configured to receive a message that is from the network device and includes a first key encrypted by using a third key.

The third key is a key generated by the network device according to the second key.

Further, the acquiring unit A201 is further configured to: if the network device is not a network device serving the user equipment, receive the message that is from the network device serving the user equipment and includes the first key, where the message including the first key is received from the network device by the network device serving the user equipment.

It should be noted that, for detailed descriptions of some functional modules of the user equipment provided by this embodiment of the present invention, reference may be made to corresponding content in the method embodiments, and details are not repeatedly described in this embodiment.

According to the user equipment provided by this embodiment of the present invention, a first key is acquired, and the first key is used to protect information transmitted on a D2D link. The user equipment uses the first key to protect data transmitted on the D2D link, which can avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 11:
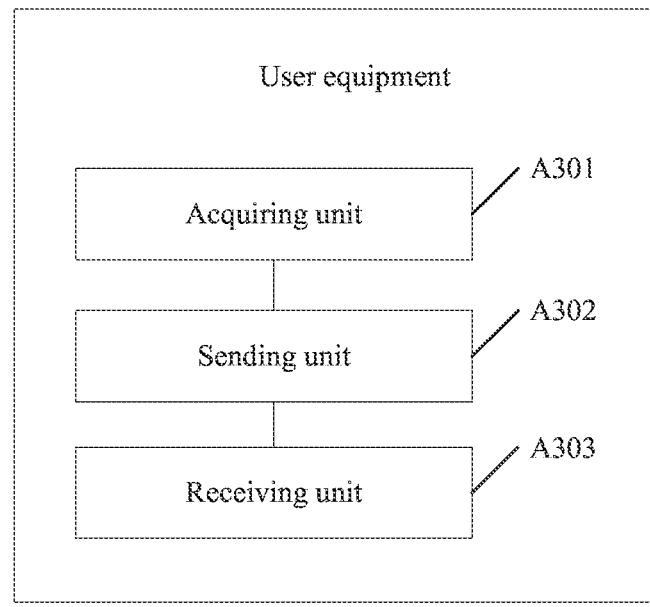
FIG. 11 is a schematic composition diagram of a user equipment according to another embodiment of the present invention.

Another embodiment of the present invention provides a user equipment, where a D2D link is established between the user equipment and a second user equipment. As shown in FIG. 11, the user equipment includes an acquiring unit A301, a sending unit A302, and a receiving unit A303.

The acquiring unit A301 is configured to acquire a first DH exchange value.

The sending unit A302 is configured to send the first DH exchange value to a network device, so that the network device sends the first DH exchange value to the second user equipment; the second user equipment acquires a second DH exchange value; further, the second user equipment generates a key according to the first DH exchange value; and further, the second user equipment sends the second DH exchange value to the network device.

The receiving unit A303 is configured to receive the second DH exchange value from the network device, and generate the key according to the second DH exchange value.

The key is used to protect data transmitted on the D2D link.

Further, the network device is an evolved Node B (eNB), a mobility management entity (MME), or a proximity service server.

It should be noted that, for detailed descriptions of some functional modules of the user equipment provided by this embodiment of the present invention, reference may be made to corresponding content in the method embodiments, and details are not repeatedly described in this embodiment.

According to the user equipment provided by this embodiment of the present invention, an acquiring unit is configured to acquire a first DH exchange value, and then a sending unit is configured to send the first DH exchange value to a network device, so that the network device sends the first DH exchange value to a second user equipment; the second user equipment acquires a second DH exchange value; further, the second user equipment generates a key according to the first DH exchange value; the second user equipment sends the second DH exchange value and an identifier of the user equipment to the network device; and finally, a receiving unit is configured to receive the second DH exchange value from the network device, and a processor is configured to generate the key according to the second DH exchange value. Compared with a problem that information is tampered with because there is no corresponding security mechanism when a user equipment (UE) transmits service data or a signaling message through a Ud interface, the user equipment and the second user equipment may generate a same shared key by using a shared parameter and a random natural number, so that user equipments establishing a D2D link share a set of keys, and further, information security can be achieved when a user equipment transmits service data or a signaling message through a Ud interface.

Figure 12:
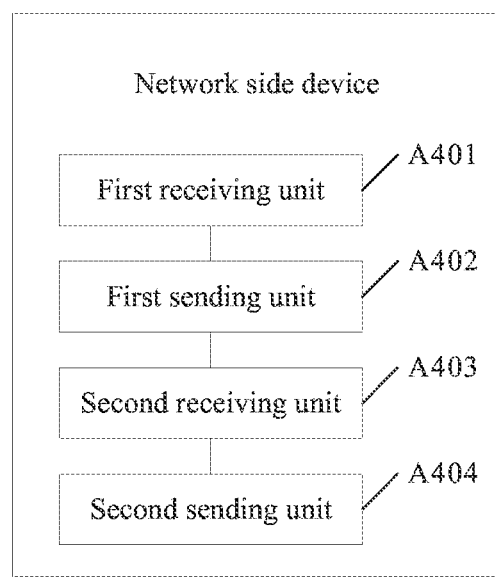
FIG. 12 is a schematic composition diagram of a network device according to another embodiment of the present invention.

Another embodiment of the present invention provides a network device, where a D2D link is established between a first user equipment and a second user equipment. As shown in FIG. 12, the network device includes a first receiving unit A401, a first sending unit A402, a second receiving unit A403, and a second sending unit A404.

The first receiving unit A4o1 is configured to receive a first DH exchange value from the first user equipment.

The first sending unit A402 is configured to send the first DH exchange value to the second user equipment, so that the second user equipment acquires a second DH exchange value, and further, the second user equipment generates a key according to the first DH exchange value.

The second receiving unit A403 is configured to receive the second DH exchange value from the second user equipment.

The second sending unit A404 is configured to send the second DH exchange value to the first user equipment, so that the first user equipment generates the key according to the second DH exchange value.

It should be noted that, for detailed descriptions of some functional modules of the network device provided by this embodiment of the present invention, reference may be made to corresponding content in the method embodiments, and details are not repeatedly described in this embodiment.

The network device provided by this embodiment of the present invention receives a first DH exchange value from a first user equipment, and sends the first DH exchange value to a second user equipment, so that the second user equipment acquires a second DH exchange value, and further, the second user equipment generates a key according to the first DH exchange value; then the network device receives the second DH exchange value from the second user equipment, and finally sends the second DH exchange value to the first user equipment, so that the first user equipment generates the key according to the second DH exchange value. Compared with a problem that information is tampered with because there is no corresponding security mechanism when a user equipment (UE) transmits service data or a signaling message through a Ud interface, the network device may forward an exchange value between the first user equipment and the second user equipment, so that the first user equipment and the second user equipment generate a shared key, which can enable user equipments establishing a D2D link to share a set of keys; and further, information security can be achieved when a user equipment transmits service data or a signaling message through a Ud interface.

Figure 13:
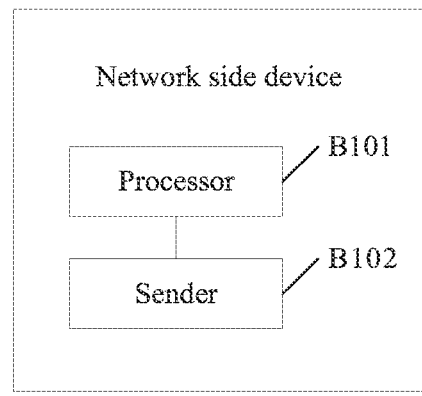
FIG. 13 is a schematic composition diagram of a network device according to another embodiment of the present invention.

Another embodiment of the present invention provides a network device, where a D2D link is established between a first user equipment and a second user equipment. As shown in FIG. 13, the network device includes a processor B101 and a sender B102.

The processor B101 is configured to acquire a first key.

The sender B102 is configured to send a message including the first key to the second user equipment, so that the second user equipment uses, when communicating with the first user equipment by using the D2D link, the first key to protect transmitted information.

Further, the network device is an evolved Node B (eNB), a mobility management entity (MME), or a proximity service server.

Further, the processor B101 is further configured to acquire a second key, and generate the first key according to the second key by using a key derivation function.

Further, when the network device is an evolved Node B (eNB), the second key is a shared key between the eNB and the first user equipment.

When the network device is a mobility management entity (MME), the second key is a shared key between the MME and the first user equipment.

When the network device is a proximity service server, the second key is a shared key between the proximity service server and the first user equipment.

Further, the processor B101 is further configured to generate the first key according to the second key and the first parameter by using the key derivation function.

The first parameter includes a packet data convergence protocol (PDCP) serial number between the eNB and the first user equipment, or the first parameter includes a non-access stratum message serial number between the MME and the first user equipment, or the first parameter includes a random number generated by the network device.

Further, the first key is a random key acquired by the network device.

The sender B102 is further configured to: after the processor B101 acquires the first key, send a message including the first key to the first user equipment, so that the first user equipment uses, when communicating with the second user equipment by using the D2D link, the first key to protect the transmitted information.

Further, in one application scenario of this embodiment of the present invention, the network device further includes a receiver B103.

The receiver B103 is configured to: before the sender B102 sends the message including the first key to the first user equipment, receive a first public key from the first user equipment.

The processor B101 is further configured to encrypt the first key by using the first public key.

The first public key and a first private key that is reserved by the first user equipment form a first public-private key pair.

Alternatively, in another application scenario of this embodiment of the present invention, the processor B101 is further configured to generate a third key according to a second key, and encrypt the first key by using the third key, where the second key is a shared key between the network device and the first user equipment.

The sender B102 is further configured to send a message including a second key encrypted by the processor B101 to the first user equipment.

Further, the sender B102 is further configured to send the message including the first key to the first user equipment by using an encrypted connection between the network device and the first user equipment.

Further, in one application scenario of this embodiment of the present invention, the receiver B103 is further configured to: before the sender B102 sends the message including the first key to the second user equipment, receive a second public key from the second user equipment.

The processor B101 is further configured to encrypt the first key by using the second public key.

The second public key and a second private key that is reserved by the second user equipment form a second public-private key pair.

Alternatively, in another application scenario of this embodiment of the present invention, the processor B101 is further configured to: acquire a fourth key, where the fourth key is a shared key between the network device and the second user equipment; and generate a fifth key according to the fourth key, and encrypt the first key by using the fifth key.

The sender B102 is further configured to send a message including a second key encrypted by the processor B101 to the second user equipment.

Further, the sender B102 is further configured to send the message including the first key to the second user equipment by using an encrypted connection between the network device and the second user equipment.

Further, the processor B101 is further configured to determine, according to a prestored cryptographic algorithm list, a security capability of the first user equipment, and a security capability of the second user equipment, a cryptographic algorithm that is applicable to the first user equipment, that is applicable to the second user equipment, and whose priority ranks first in the cryptographic algorithm list.

The sender B102 is further configured to send the cryptographic algorithm to the first user equipment and the second user equipment.

The security capability of the first user equipment is used to indicate a cryptographic algorithm applicable to the first user equipment, and the security capability of the second user equipment is used to indicate a cryptographic algorithm applicable to the second user equipment.

Further, the cryptographic algorithm includes an encryption algorithm and/or an integrity protection algorithm, where the encryption algorithm is used to encrypt data transmitted on the D2D link, and the integrity protection algorithm is used to perform integrity protection on information transmitted on the D2D link.

Further, the sender B102 is further configured to: if the network device is not a network device serving the second user equipment, send the message including the first key to the network device serving the second user equipment, so that the network device serving the second user equipment forwards the message including the first key to the second user equipment.

It should be noted that, for detailed descriptions of some functional modules of the network device provided by this embodiment of the present invention, reference may be made to corresponding content in the method embodiments, and details are not repeatedly described in this embodiment.

The network device provided by this embodiment of the present invention acquires a first key, and sends a message including the first key to a second user equipment, so that the second user equipment uses, when communicating with a first user equipment by using a D2D link, the first key to protect transmitted information. Therefore, it may avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 14:
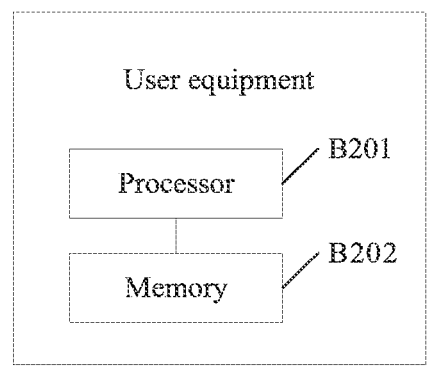
FIG. 14 is a schematic composition diagram of a user equipment according to another embodiment of the present invention.

Another embodiment of the present invention provides a user equipment, where a D2D link is established between the user equipments. As shown in FIG. 14, the user equipment includes a processor B201 and a memory B202.

The processor B201 is configured to acquire a first key.

The memory B202 is configured to store the first key acquired by the processor B201.

The processor B201 is further configured to use, when communicating with the second user equipment by using the D2D link, the first key to protect transmitted information.

Further, the user equipment may further include a receiver B203.

The receiver B203 is configured to: after the processor B201 acquires the first key, receive a cryptographic algorithm from a network device, where the network device is an evolved Node B (eNB), a mobility management entity (MME), or a proximity service server, and the cryptographic algorithm includes an encryption algorithm and/or an integrity protection algorithm.

The processor B201 is further configured to: generate an encryption key according to the first key and an identifier of the encryption algorithm; generate an integrity protection key according to the first key and an identifier of the integrity protection algorithm; encrypt, by using the encryption key and the encryption algorithm, information transmitted on the D2D link; and perform, by using the integrity protection key and the integrity protection algorithm, integrity protection on the information transmitted on the D2D link.

Further, the processor B201 is further configured to: acquire a second key, where the second key is a shared key between the network device and the user equipment; and generate the first key according to the second key by using a key derivation function.

Alternatively, the receiver B203 is further configured to receive a message that is from the network device and includes the first key.

Further, when the network device is an evolved Node B (eNB), the second key is a shared key between the eNB and the user equipment.

When the network device is a mobility management entity (MME), the second key is a shared key between the MME and the user equipment.

When the network device is a proximity service server, the second key is a shared key between the proximity service server and the user equipment.

Further, the processor B201 is further configured to generate the first key according to the second key and a first parameter by using the key derivation function.

The first parameter includes a packet data convergence protocol (PDCP) serial number between the eNB and the user equipment, or the first parameter includes a non-access stratum message serial number between the MME and the user equipment, or the first parameter includes a random number generated by the network device.

Further, the user equipment may further include a sender B204.

The sender B204 is configured to: before the receiver B203 receives the message that is from the network device and includes the first key, send a public key to the network device, so that the network device encrypts the first key by using the public key, where the public key and a private key that is reserved by the user equipment form a public-private key pair.

Further, the receiver B203 is further configured to receive a message that is from the network device and includes a first key encrypted by using the public key.

Further, the receiver B203 is further configured to receive, by using an encrypted connection between the user equipment and the network device, the message that is from the network device and includes the first key.

Further, the receiver B203 is further configured to receive a message that is from the network device and includes a first key encrypted by using a third key.

The third key is a key generated by the network device according to the second key.

The receiver B203 is further configured to receive a message that is from the network device and includes the encrypted first key.

Further, the receiver B203 is further configured to: if the network device is not a network device serving the user equipment, receive the message that is from the network device serving the user equipment and includes the first key, where the message including the first key is received from the network device by the network device serving the user equipment.

It should be noted that, for detailed descriptions of some functional modules of the user equipment provided by this embodiment of the present invention, reference may be made to corresponding content in the method embodiments, and details are not repeatedly described in this embodiment.

According to the user equipment provided by this embodiment of the present invention, the user equipment acquires a first key, and uses the first key to protect information transmitted on a D2D link. The user equipment uses the first key to protect data transmitted on the D2D link, which can avoid a problem that information is tampered with because there is no corresponding security mechanism when a user equipment (UE) transmits service data or a signaling message through a Ud interface; further, information security can be achieved when a user equipment transmits service data or a signaling message through a Ud interface.

Figure 15:
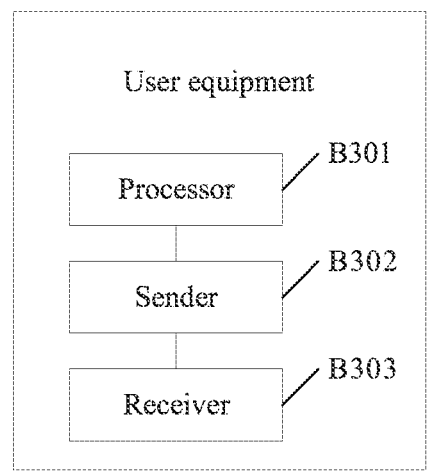
FIG. 15 is a schematic composition diagram of a user equipment according to another embodiment of the present invention.

Another embodiment of the present invention provides a user equipment, where a D2D link is established between the user equipment and a second user equipment. As shown in FIG. 15, the user equipment includes a processor B3o1, a sender B302, and a receiver B303.

The processor B301 is configured to acquire a first DH exchange value.

The sender B302 is configured to send the first DH exchange value to a network device, so that the network device sends the first DH exchange value to the second user equipment; the second user equipment acquires a second DH exchange value; further, the second user equipment generates a key according to the first DH exchange value; and further, the second user equipment sends the second DH exchange value to the network device.

The receiver B303 is configured to receive the second DH exchange value from the network device.

The processor B301 is further configured to generate the key according to the second DH exchange value.

The key is used to protect data transmitted on the D2D link.

Further, the network device is an evolved Node B (eNB), a mobility management entity (MME), or a proximity service server.

It should be noted that, for detailed descriptions of some functional modules of the user equipment provided by this embodiment of the present invention, reference may be made to corresponding content in the method embodiments, and details are not repeatedly described in this embodiment.

According to the user equipment provided by this embodiment of the present invention, an acquiring unit is configured to acquire a first DH exchange value, and then a sending unit is configured to send the first DH exchange value to a network device, so that the network device sends the first DH exchange value to a second user equipment; the second user equipment acquires a second DH exchange value; further, the second user equipment generates a key according to the first DH exchange value; the second user equipment sends the second DH exchange value and an identifier of the user equipment to the network device; and finally, a receiving unit is configured to receive the second DH exchange value from the network device, and a processor is configured to generate the key according to the second DH exchange value. Compared with a problem that information is tampered with because there is no corresponding security mechanism when a user equipment (UE) transmits service data or a signaling message through a Ud interface, the user equipment and the second user equipment may generate a same shared key by using a shared parameter and a random natural number, so that user equipments establishing a D2D link share a set of keys, and further, information security can be achieved when a user equipment transmits service data or a signaling message through a Ud interface.

Figure 16:
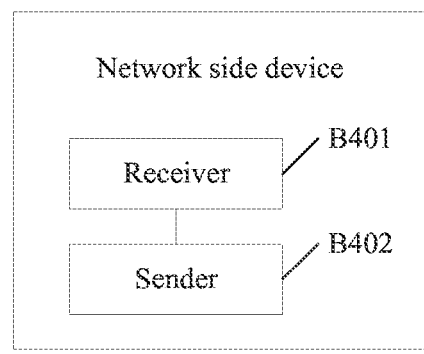
FIG. 16 is a schematic composition diagram of a network device according to another embodiment of the present invention.

Another embodiment of the present invention provides a network device, where a D2D link is established between a first user equipment and a second user equipment. As shown in FIG. 16, the network device includes a receiver B401 and a sender B402.

The receiver B401 is configured to receive a first DH exchange value from the first user equipment.

The sender B402 is configured to send the first DH exchange value to the second user equipment, so that the second user equipment acquires a second DH exchange value, and further, the second user equipment generates a key according to the first DH exchange value.

The receiver B401 is further configured to receive the second DH exchange value from the second user equipment.

The sender B402 is further configured to send the second DH exchange value to the first user equipment, so that the first user equipment generates the key according to the second DH exchange value.

The network device provided by this embodiment of the present invention receives a first DH exchange value from a first user equipment, and sends the first DH exchange value to a second user equipment, so that the second user equipment acquires a second DH exchange value, and further, the second user equipment generates a key according to the first DH exchange value; then the network device receives the second DH exchange value from the second user equipment, and finally sends the second DH exchange value to the first user equipment, so that the first user equipment generates the key according to the second DH exchange value. Compared with a problem that information is tampered with because there is no corresponding security mechanism when a user equipment (UE) transmits service data or a signaling message through a Ud interface, the network device may forward an exchange value between the first user equipment and the second user equipment, so that the first user equipment and the second user equipment generate a shared key, which can enable user equipments establishing a D2D link to share a set of keys; and further, information security can be achieved when a user equipment transmits service data or a signaling message through a Ud interface.

As seen from the description of the foregoing embodiments, it may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
    a non-transitory memory storage comprising instructions; and
    one or more processors in communication with the non-transitory memory storage, wherein the one or more processors are configured to execute the instructions to:
        receive a second key from a network device, wherein the second key is shared by the network device and a second user equipment, and the apparatus is the second user equipment, or the apparatus is applied to the second user equipment; and
        generate, according to the second key and a first parameter, a first key using a key derivation function, wherein information communicated between the second user equipment and a first user equipment using a device-to-device (D2D) link between the second user equipment and the first user equipment is protected based on the first key.

2. The apparatus according to claim 1, wherein the first parameter comprises a random number.

3. The apparatus according to claim 1, wherein the one or more processors are configured to further execute the instructions to:
    obtain an encryption algorithm identifier; and
    generate an encryption key according to the first key and the encryption algorithm identifier; and
    wherein the information communicated between the second user equipment and the first user equipment using the D2D link between the second user equipment and the first user equipment is encrypted based on the encryption key and an encryption algorithm corresponding to the encryption algorithm identifier.

4. The apparatus according to claim 1, wherein the one or more processors are configured to further execute the instructions to:
    obtain the first parameter from the network device.

5. An apparatus, comprising:
    a non-transitory memory storage comprising instructions; and
    one or more processors in communication with the non-transitory memory storage, wherein the one or more processors are configured to execute the instructions to:
        send a second key to a first user equipment, wherein the second key is shared by a network device and the first user equipment, and the apparatus is the network device or the apparatus is applied to the network device; and
        wherein information communicated between the first user equipment and a second user equipment using a device-to-device (D2D) link between the second user equipment and the first user equipment is protected based on a first key, and the first key is derived by the first user equipment based on the second key and a first parameter.

6. The apparatus according to claim 5, wherein the first parameter comprises a random number.

7. The apparatus according to claim 5, wherein the one or more processors are configured to further execute the instructions to:
    send an encryption algorithm identifier to the first user equipment, wherein the encryption algorithm identifier corresponds to an encryption algorithm; and
    wherein the information communicated between the first user equipment and the second user equipment using the D2D link between the second user equipment and the first user equipment is encrypted based on the encryption algorithm and an encryption key, and the encryption key is derived based on the first key and the encryption algorithm identifier.

8. The apparatus according to claim 5, wherein the one or more processors are configured to further execute the instructions to:
    send the first parameter to the first user equipment.

9. A method, comprising:
    sending, by a network device, a second key to a first user equipment, wherein the second key is shared by the network device and the first user equipment; and
    wherein information communicated between the first user equipment and a second user equipment using a device-to-device (D2D) link between the second user equipment and the first user equipment is protected based on a first key, and the first key is derived by the first user equipment based on the second key and a first parameter.

10. The method according to claim 9, wherein the first parameter comprises a random number.

11. The method according to claim 9, further comprising:
    sending an encryption algorithm identifier to the first user equipment, wherein the encryption algorithm identifier corresponds to an encryption algorithm; and
    wherein the information communicated between the first user equipment and the second user equipment using the D2D link between the second user equipment and the first user equipment is encrypted based on the encryption algorithm and an encryption key, and the encryption key is derived based on the first key and the encryption algorithm identifier.

12. The method according to claim 9, further comprising: sending the first parameter to the first user equipment.

13. A non-transitory computer readable medium, wherein the non-transitory computer readable medium stores instructions that are executable by a computer, and the instructions comprise instructions for:

sending a second key to a first user equipment, wherein the second key is shared by a network device and the first user equipment; and wherein information communicated between the first user equipment and a second user equipment using a device-to-device (D2D) link between the second user equipment and the first user equipment is protected based on a first key, and the first key is derived by the first user equipment based on the second key and a first parameter.

14. The non-transitory computer readable medium according to claim 13, wherein the first parameter comprises a random number.

15. The non-transitory computer readable medium according to claim 13, wherein the instructions further comprise instructions for:

sending an encryption algorithm identifier to the first user equipment, wherein the encryption algorithm identifier corresponds to an encryption algorithm; and wherein the information communicated between the first user equipment and the second user equipment using the D2D link between the second user equipment and the first user equipment is encrypted based on the encryption algorithm and an encryption key, and the encryption key is derived based on the first key and the encryption algorithm identifier.

16. The non-transitory computer readable medium according to claim 13, wherein the instructions further comprise instructions for:

sending the first parameter to the first user equipment.

17. A method, comprising:

receiving, by a first user equipment, a second key from a network device, wherein the second key is shared by the network device and the first user equipment; and generating, according to the second key and a first parameter, a first key by using a key derivation function, wherein information communicated between the first user equipment and a second user equipment using a device-to-device (D2D) link between the second user equipment and the first user equipment is protected based on the first key.

18. The method according to claim 17, wherein the first parameter comprises a random number.

19. The method according to claim 17, further comprising:

obtaining an encryption algorithm identifier; and generating an encryption key according to the first key and the encryption algorithm identifier; and wherein the information communicated between the first user equipment and the second user equipment using the D2D link between the second user equipment and the first user equipment is encrypted based on the encryption key and an encryption algorithm corresponding to the encryption algorithm identifier.

20. The method according to claim 17, further comprising:

obtaining the first parameter from the network device.

* * * * *